(12) United States Patent
Graham et al.

(10) Patent No.: US 10,724,544 B2
(45) Date of Patent: Jul. 28, 2020

(54) CENTRIFUGAL COMPRESSOR

(71) Applicant: Vortech Engineering, Inc., Oxnard, CA (US)

(72) Inventors: Gregory Graham, Ventura, CA (US); Robert Anderson, Ventura, CA (US); James Middlebrook, Santa Rosa Valley, CA (US)

(73) Assignee: Vortech Engineering, Inc., Oxnard, CA (US)

( * ) Notice: Subject to any disclaimer, the term of this patent is extended or adjusted under 35 U.S.C. 154(b) by 1042 days.

(21) Appl. No.: 14/999,709

(22) Filed: Jun. 16, 2016

(65) Prior Publication Data

US 2016/0298648 A1    Oct. 13, 2016

Related U.S. Application Data

(63) Continuation-in-part of application No. 13/385,196, filed on Feb. 6, 2012, now abandoned.

(60) Provisional application No. 61/462,801, filed on Feb. 7, 2011.

(51) Int. Cl.
| | |
|---|---|
| *F04D 29/056* | (2006.01) |
| *F04D 29/42* | (2006.01) |
| *F04D 29/58* | (2006.01) |
| *F04D 25/06* | (2006.01) |
| *F04D 29/28* | (2006.01) |
| *F04D 17/10* | (2006.01) |
| *F04D 29/051* | (2006.01) |
| *F04D 25/08* | (2006.01) |
| *F16C 17/04* | (2006.01) |

(52) U.S. Cl.
CPC ........ *F04D 29/5806* (2013.01); *F04D 17/10* (2013.01); *F04D 25/06* (2013.01); *F04D 25/082* (2013.01); *F04D 29/0513* (2013.01); *F04D 29/284* (2013.01); *F16C 17/045* (2013.01); *F05D 2260/39* (2013.01)

(58) Field of Classification Search
CPC ............ F04D 29/5806; F04D 29/0513; F04D 25/082; F16C 17/042; F16C 17/045; F16C 33/1015; F16C 33/1005
See application file for complete search history.

(56) References Cited

U.S. PATENT DOCUMENTS

| | | |
|---|---|---|
| 2,844,101 A | 7/1958 | Burns |
| 4,362,020 A | 12/1982 | Meacher et al. |
| 6,817,845 B2 | 11/2004 | Angle et al. |

(Continued)

FOREIGN PATENT DOCUMENTS

| | | | | |
|---|---|---|---|---|
| CN | 102261374 A | * | 11/2011 | .............. F16C 33/02 |
| WO | WO 2008138379 A1 | | 11/2008 | |

*Primary Examiner* — Justin D Seabe

(57) ABSTRACT

A centrifugal compressor is provided. The centrifugal compressor includes a housing and a rotatable assembly mounted for rotation about an axis within the housing. The rotatable assembly includes an impeller forming part of a compressor stage. A first air intake is located at a first end of the apparatus, the first air intake providing an air source for the compressor stage and a second air intake is located at a second end of the apparatus. A thrust plate is attached to the rotatable assembly, the thrust plate including at least one interior channel so that air entering the second air inlet passes through the at least one interior channel.

12 Claims, 22 Drawing Sheets

(56) References Cited

U.S. PATENT DOCUMENTS

| | | | |
|---|---|---|---|
| 7,342,332 B2* | 3/2008 | McAuliffe | H02K 7/083 |
| | | | 310/58 |
| 7,704,056 B2* | 4/2010 | Masoudipour | F04D 17/122 |
| | | | 417/367 |
| 8,616,831 B2 | 12/2013 | Wollstadt et al. | |
| 2002/0037215 A1 | 3/2002 | Choi et al. | |
| 2008/0246281 A1* | 10/2008 | Agrawal | F01D 15/005 |
| | | | 290/52 |
| 2015/0270566 A1 | 9/2015 | Lee | |
| 2016/0032931 A1 | 2/2016 | Lee | |

* cited by examiner

CENTRIFUGAL COMPRESSOR

This application claims priority under 35 U.S.C. § 120 as a continuation-in-part of U.S. patent application Ser. No. 13/385,196, filed Feb. 6, 2012, entitled "Centrifugal Compressor," which claims priority to U.S. provisional patent application Ser. No. 61/462,801, filed Feb. 7, 2011, entitled "Centrifugal Compressor," which is referred to and incorporated herein in its entirety by this reference.

FIELD OF THE INVENTION

The present invention generally relates to compressors. More particularly, the invention concerns a centrifugal compressor.

BACKGROUND OF THE INVENTION

Centrifugal compressors have existed for many years, and there exist many different designs. Historically, compressed air (or a gas/air mixture) has been generated by various types of motor driven machines. To achieve high efficiency, the motor must drive the centrifugal compressor at high rotational speeds. As rotational speeds become greater the overall machine size can be made smaller, while maintaining the same compressed air flows, pressures, and motor power. However, requirements for running at high speeds include properly designed rotating and non-rotating assemblies and bearings to support the high speed rotating shaft, typically ranging from 30,000 rpm to 200,000 rpm.

Air or water cooling may be employed to dissipate heat that is generated. However, liquid cooling has several drawbacks including additional system complexity and increased manufacturing and unit cost, and the potential for fluid leaks into the compressor/motor internals is also a concern. For the very small machines, power density is exceptional and therefore the ability to reject heat from the machines relatively little surface area becomes challenging.

Therefore, there remains a need to overcome one or more of the limitations in the above-described, existing art.

Figure 1:
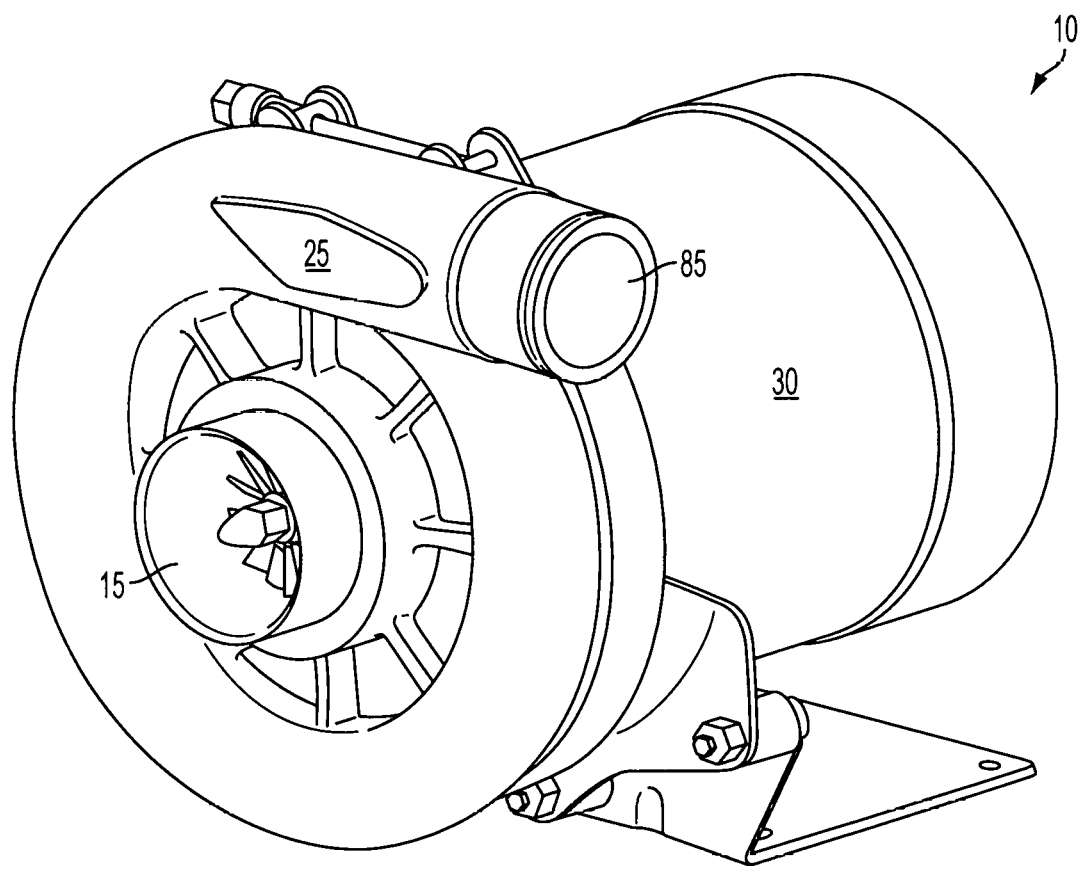
FIG. 1 comprises a perspective view of one embodiment of the centrifugal compressor of the present invention.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the centrifugal compressor of the present invention. It will be apparent, however, to one skilled in the art that the centrifugal compressor may be practiced without some of these specific details. Throughout this description, the embodiments and examples shown should be considered as exemplars, rather than as limitations on the centrifugal compressor. That is, the following description provides examples, and the accompanying drawings show various examples for the purposes of illustration. However, these examples should not be construed in a limiting sense as they are merely intended to provide examples of the centrifugal compressor rather than to provide an exhaustive list of all possible implementations of the centrifugal compressor.

Referring now to FIGS. 1-6, the centrifugal compressor 10 includes many novel features including, among others, an air-cooled design that provides reduced system complexity and cost and that also eliminates the possibility of fluid internal leaks into the motor/compressor internals. The air cooled design comprises multiple air-cooling circuits that ensure sufficient cooling air supply for the unit.

Another feature is a foil air bearing system that supports the impeller shaft. The foils eliminate the need for costly high-temperature coatings on the foil bearing surfaces, which are usually required on units that operate at higher operating temperatures.

Yet another feature comprises a heat exchanging element that efficiently transfers heat generated by the electric motor stator and also allows cool air flow passage, thereby dissipating the generated heat.

Other features include a compact, lightweight design that eliminates many seals, gaskets and other elements found in conventional compressors. Yet, the pneumatic power i.e., flow and pressure rise (aka "process air") equals the output of much larger and heavier units, thereby enabling the installation of the centrifugal compressor 10 in aircraft to provide on-board inert gas and on-board oxygen generation (aka OBIGGS & OBOGS). In at least one exemplary case, a 20 horsepower compressor is attained in a package weight totaling 12 pounds.

As a background, the specific speed of the centrifugal machine is of primary importance to the designer as it relates and balances the general size, i.e., impeller diameter against the rotational speed for a given head rise. For example, impeller diameter may be traded for rotational speed to yield the same head rise. However, there is a limit as to how big a diameter may be traded for reduced rotational speed, without incurring significant losses. For designs that require relatively high pressure rise at relatively low flows, a smaller, faster rotating machine is desired in order to yield an acceptable specific speed.

Figure 2:
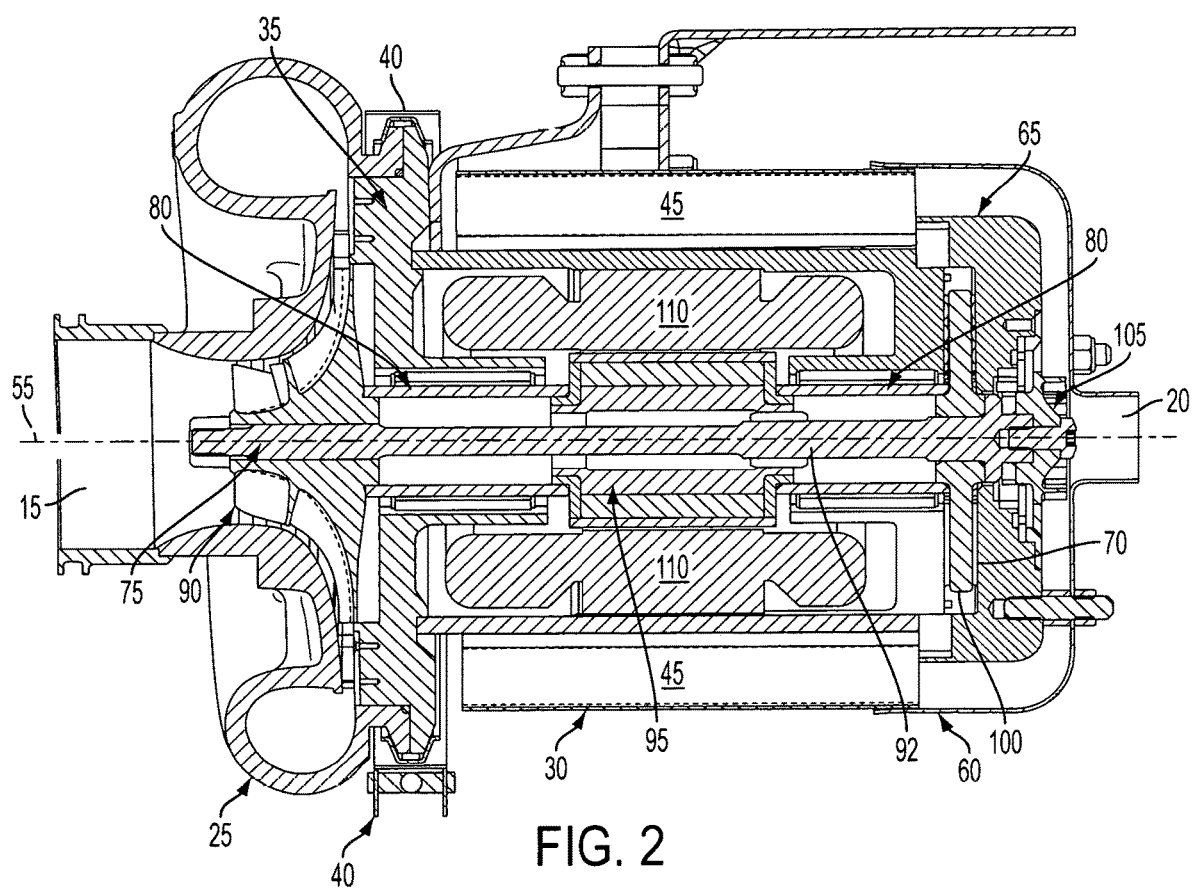
FIG. 2 comprises a cross-sectional view of the embodiment of FIG. 1.

Referring now to FIGS. 1-2, the centrifugal compressor 10 is illustrated. A first end of the centrifugal compressor 10 comprises the centrifugal compressor axial air inlet 15, with the other, second end comprising the main cooling air inlet 20.

The volute 25 couples to the base housing 30 through the back plate assembly 35 and V-band clamp 40. The base housing 30 includes a heat exchange element 45 (shown in FIG. 3) comprising a plurality of fin elements 50 densely arranged to allow air to pass between the fins along the main axis 55 of the base housing 30.

As shown in FIG. 2, the main cooling air inlet 20 attaches to a fan cover 60 that fits over the rear cover 65, which provides a thrust bearing surface 70 for the impeller shaft assembly, or rotatable assembly 75 that rides on two air bearing journals 80.

Referring again to FIGS. 1-2, the centrifugal compressor 10 is generally symmetric about the compressor axis 55. The compressor inlet 15 receives a fluid medium, generally air, to be compressed, which is discharged as compressed fluid at volute exit 85. The inlet leads to a single centrifugal compressor stage comprised of an impeller 90 with the volute 25 surrounding the impeller 90 and the inlet 15.

As shown in FIG. 2 the rotating assembly, or impeller assembly 75 includes the impeller 90, a shaft 92, a first air bearing journal 80, a permanent magnet motor rotor 95, and second air bearing journal 80, a thrust load bearing 100 that balances the pressure load of the impeller 90. The impeller assembly 75 also includes a fan 105 located at the distal end of the impeller assembly 75, the fan 105 located within the cooling air inlet 15.

The motor rotor 95 in the rotating assembly 75 forms the armature of an electrically driven permanent magnet, high speed motor in which the stator 110 is fixedly retained within the finned heat exchanger 45, as shown in FIG. 2. The motor rotor 95 includes a permanent magnet for enabling operation of the electric motor.

The rotating assembly 75 consisting of the impeller 90, the thrust load balancing disk 100 and the rotor motor 95 are supported for high speed rotation within the housing by means of oil-less air bearings (not shown) that are located between the rotating assembly shaft 92 and the air bearing journals 80. The foil air bearings have numerous performance, maintenance and contamination-free advantages over conventional roller or ball bearings.

Specifically, once the rotating assembly 75 is spinning quickly enough, the working fluid (usually air) pushes the foil away from the shaft 92 so that there is no more contact. The shaft 92 and foil are separated by high pressure air that is generated by the rotation which pulls air into the bearing via viscosity effects. A high speed of the shaft 92 with respect to the foil is required to initiate the air gap, and once this has been achieved, no wear occurs. Unlike aero or hydrostatic bearings, foil bearings require no external pressurization system for the working fluid, so the hydrodynamic bearing is self-starting.

Unlike contact-roller bearings, an air bearing (or air caster) utilizes a thin film of pressurized air to provide an exceedingly low friction load-bearing interface between surfaces. The two surfaces don't touch. Being non-contact, air bearings avoid the traditional bearing-related problems of friction, wear, particulates, and lubricant handling, and offer distinct advantages in precision positioning, such as lacking backlash and stiction, as well as in high-speed applications.

Figure 4:
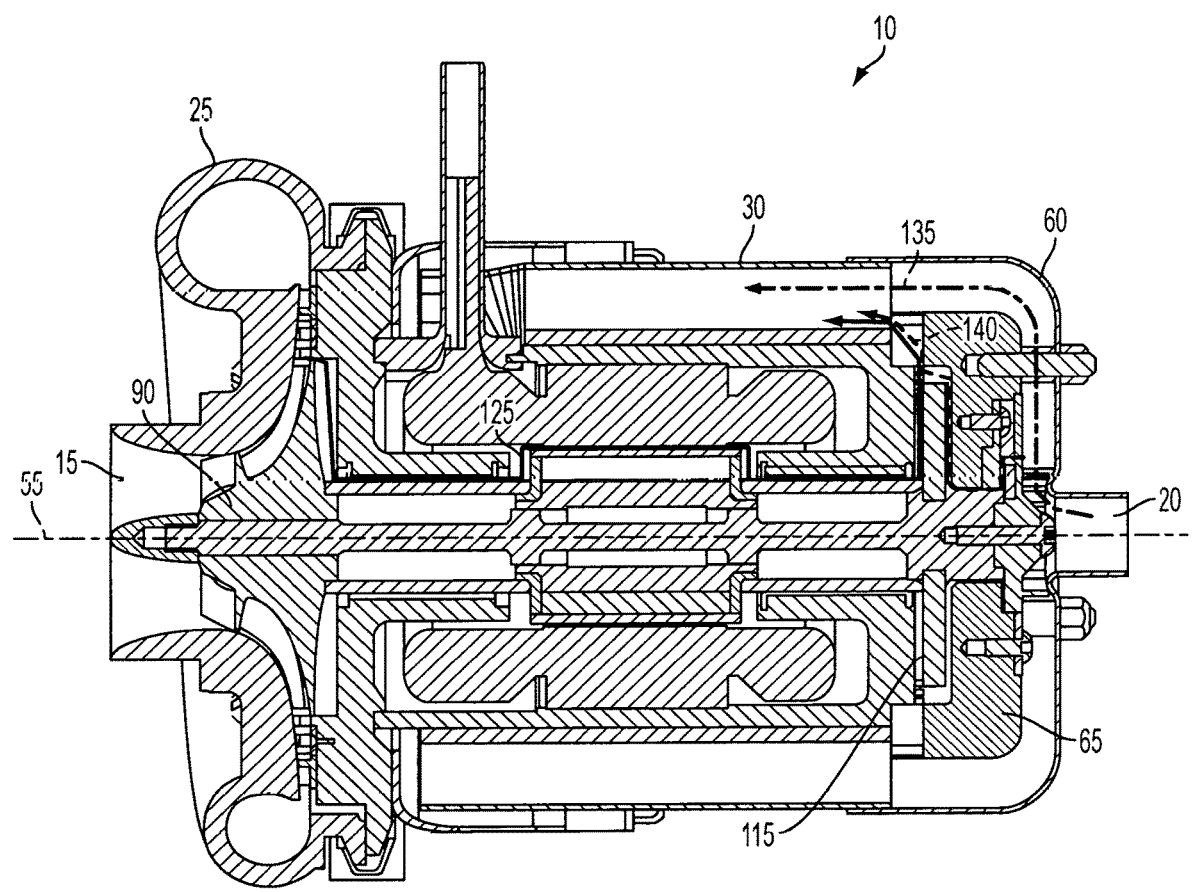
FIG. 4 comprises a cross-sectional view showing the internal air passageways located within the embodiment of FIG. 1.

The air cooling feature of the centrifugal compressor 10 will now be discussed with reference to FIG. 4. The centrifugal compressor 10 incorporates four (4) separate air passageways, or circuits:

1) Compressor Air passageway 120—also known as "process air" that enters through the compressor air inlet 15 and exits at the volute exit 85. This air is used for any number of applications, ranging from aircraft to automotive to industrial applications.

Figure 3:
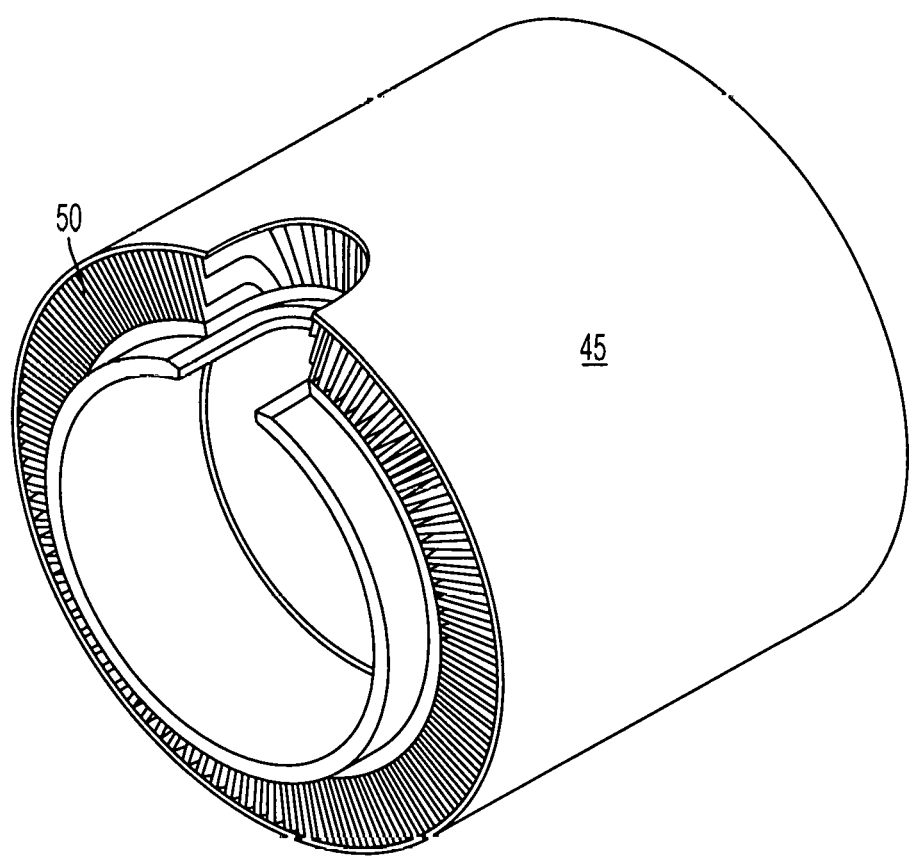
FIG. 3 comprises a perspective view of a finned heat exchange element included in the embodiment of FIG. 1.

2) Secondary Air Bleed passageway 125—This air 'bleeds' past the impeller 90 periphery and flows though a first air bearing journal 80, then the electric motor 95, past the second air bearing journal 80, then against the forward thrust bearing pad element 115, and then exits into the heat sink area (shown in FIG. 3). Exit ports 130 for the air are provided in the rear cover 65 (shown in FIG. 6).

3) Cooling Air passageway 135—This air is supplied by the rear-mounted cooling fan 105 which draws air from the cool ambient environment. Air is forced through and around the heat sink fins 50 in the finned heat exchanger 45 (shown in FIG. 3) that have a large surface area and high convective heat transfer. A low pressure region is created by the cooling air flow passing over the exit ports 130 of the rear cover 65, at the point where secondary air bleed flow enters the heat sink. This further enhances secondary air flow through the bearing and motor system, hence improving cooling efficiency. The aft-mounted cooling fan 105 is directly coupled to the high-speed impeller shaft 92. This fan is sized to provide on the order of 35 cubic feet per minute ("CFM") of airflow at only a moderate pressure rise.

4) Tertiary Air Bleed passageway 140—The fourth air circuit is an additional air-bleed which is obtained from the periphery of the cooling fan 105 (i.e., bled off), and is directed against the aft section of the thrust bearing surface 70. This bleed air exits into the heat sink cooling fins 50. Tertiary air bleed flow is also enhanced by the same low pressure region at the exit ports 130 of rear cover 65.

By including four (4) distinct air passageways the centrifugal compressor 10 can be compact yet extremely efficient. For example, the highly effective heat sink fin 50 arrangement is designed to reject 1 kilowatt ("kW") of heat or more, resulting in only a moderate temperature rise of the supplied cooling air. In one example, the electric motor total thermal losses of 900 watts will result in cooling air discharged at approximately 100° C., with the cooling air inlet at approximately 45° C. This data relates to a sustained, full load, high-speed, thermally stabilized operating condition. Parasitic power loss operates the cooling fan, but this amount on the order of 75 Watts of shaft power, or 0.5% of the maximum 15 kW power rating of the centrifugal compressor 10.

Figure 5:
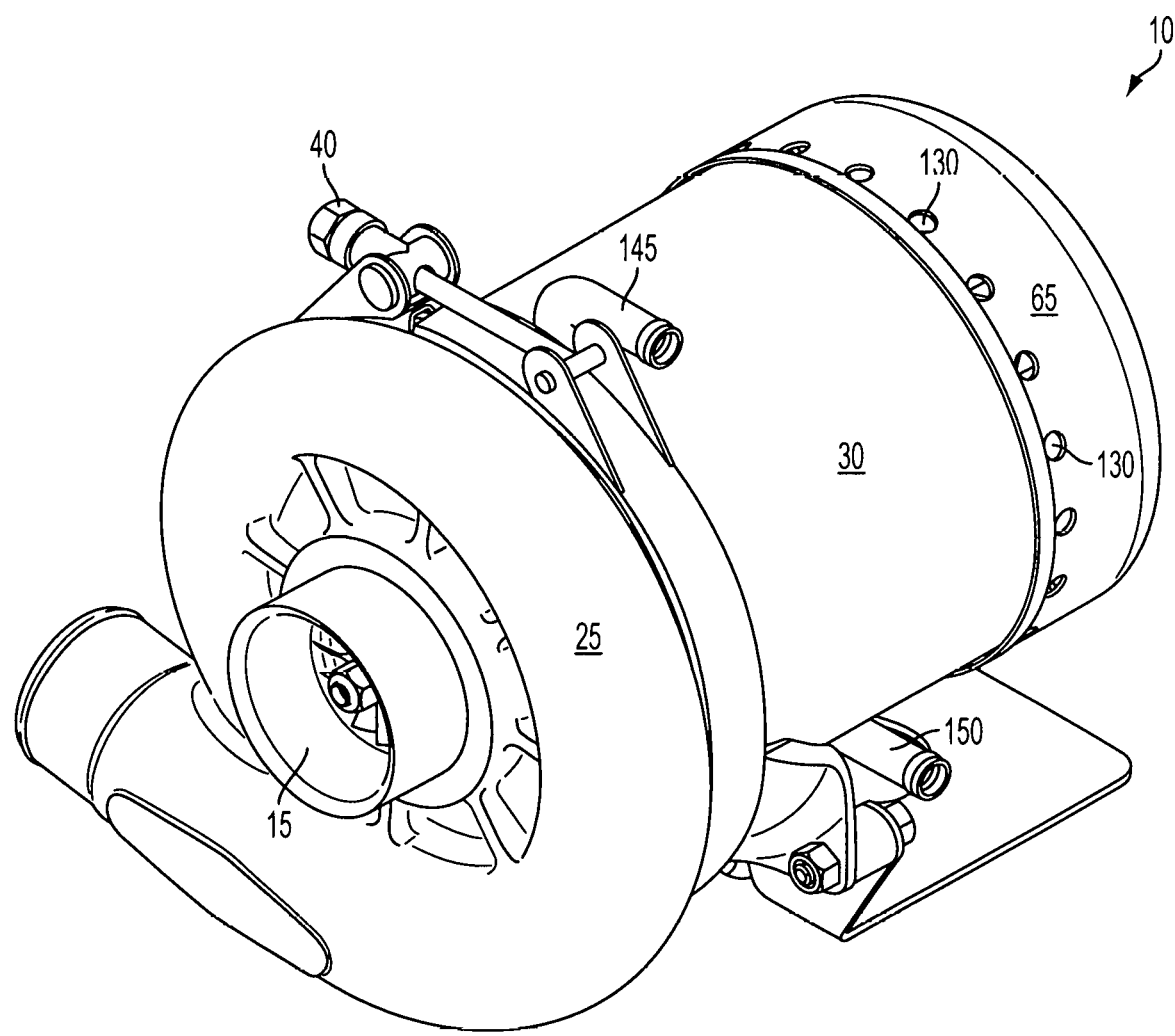
FIG. 5 comprises a perspective view of a second embodiment of the centrifugal compressor of the present invention, the second embodiment comprising a fluid-cooled centrifugal compressor.
Figure 6:
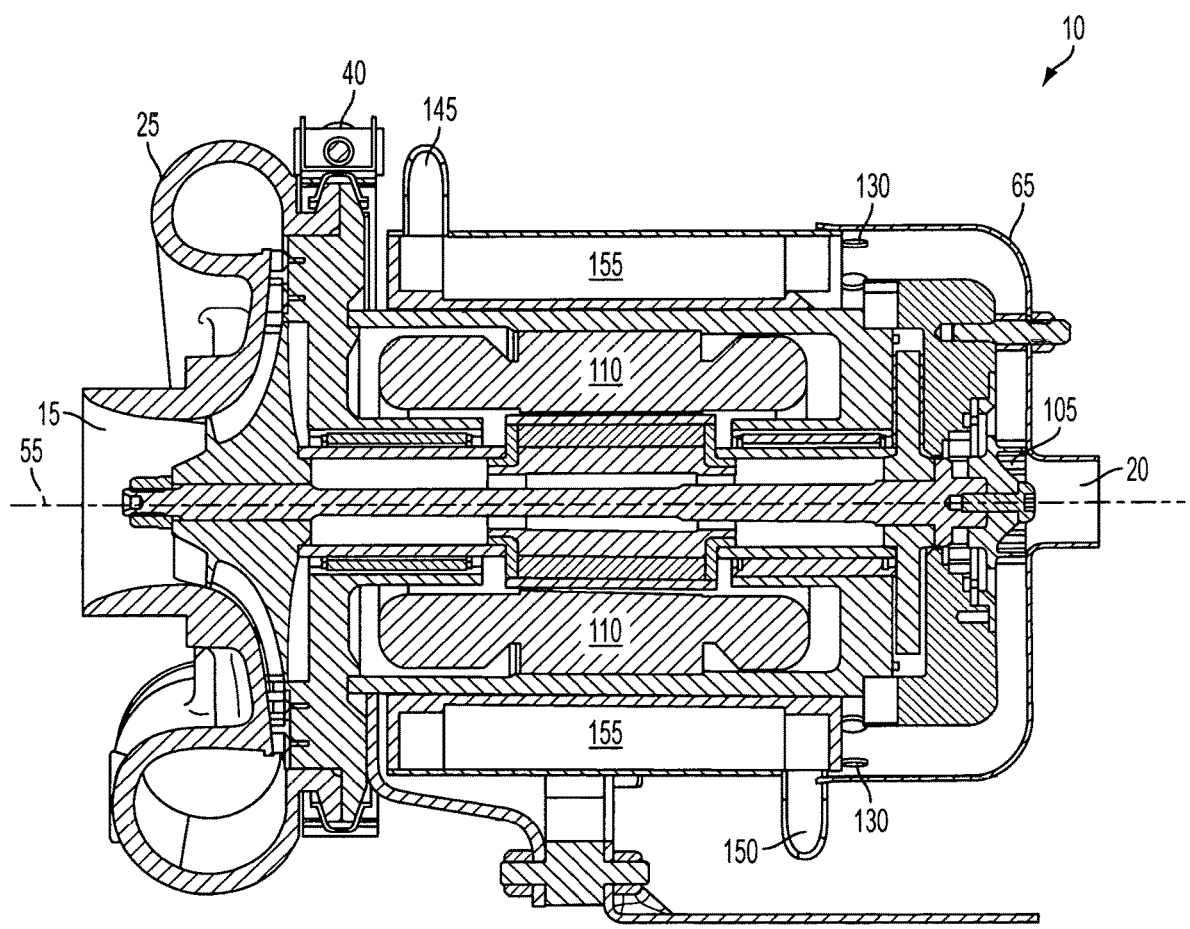
FIG. 6 comprises a cross-sectional view of the embodiment of FIG. 5.
Figure 7:
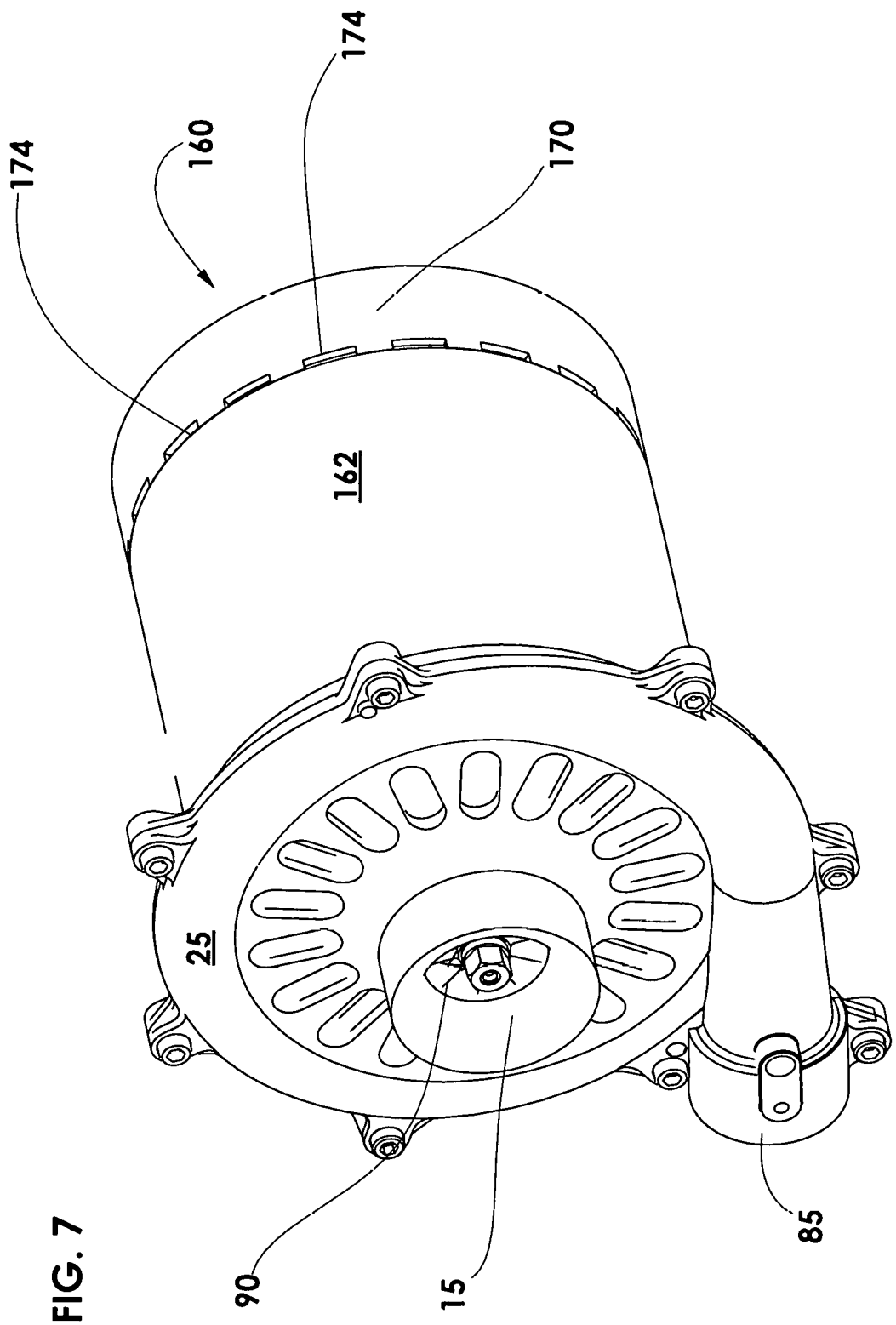
FIG. 7 comprises a perspective view of a third embodiment of a centrifugal compressor embodying principals of the present invention.

Referring now to FIGS. 5-6, a second embodiment centrifugal compressor 10 that includes water cooling in addition to air cooling is illustrated. The housing 30 includes a liquid cooling inlet 145 and liquid cooling outlet 150 for circulating a liquid cooling medium through a liquid heat exchanger 155. In this embodiment, the finned heat exchanger 45, shown in FIG. 3, is replaced with a liquid heat exchanger 155 that includes the liquid cooling inlet 145 and liquid cooling outlet 150. The four air passageways described above are still included, but instead of passing through the fin elements 50, the air, after flowing through the passageways described above, exits the air exit ports 130 in the rear cover 65.

Not illustrated is an electronic module. The electronic module controls the centrifugal compressor 10 through use of a Hall effect sensor, software and other elements as required. For example, the electronic module may include computer hardware and software and may include a computer program product which is embodied on one or more computer-usable storage media having computer-usable program code embodied therein. Computer program instructions may also be stored in a computer-readable memory that can direct the centrifugal compressor 10 to function in a particular manner, such that the instructions stored in the computer-readable memory produce an operating cycle.

Referring now to FIGS. 7-18, a third embodiment centrifugal compressor 160 is illustrated. The centrifugal compressor 160 includes many novel features, included a multi-element thrust plate assembly, an erodible coating that enables increased operating efficiencies and other features described below.

Similar to the centrifugal compressor 10, the centrifugal compressor 160 includes a housing 162, that in a preferred embodiment, comprises a unitary cylindrical element. That is, the housing 162 is made of a one-piece cylinder (the definition of "unitary" as used herein).

Figure 8:
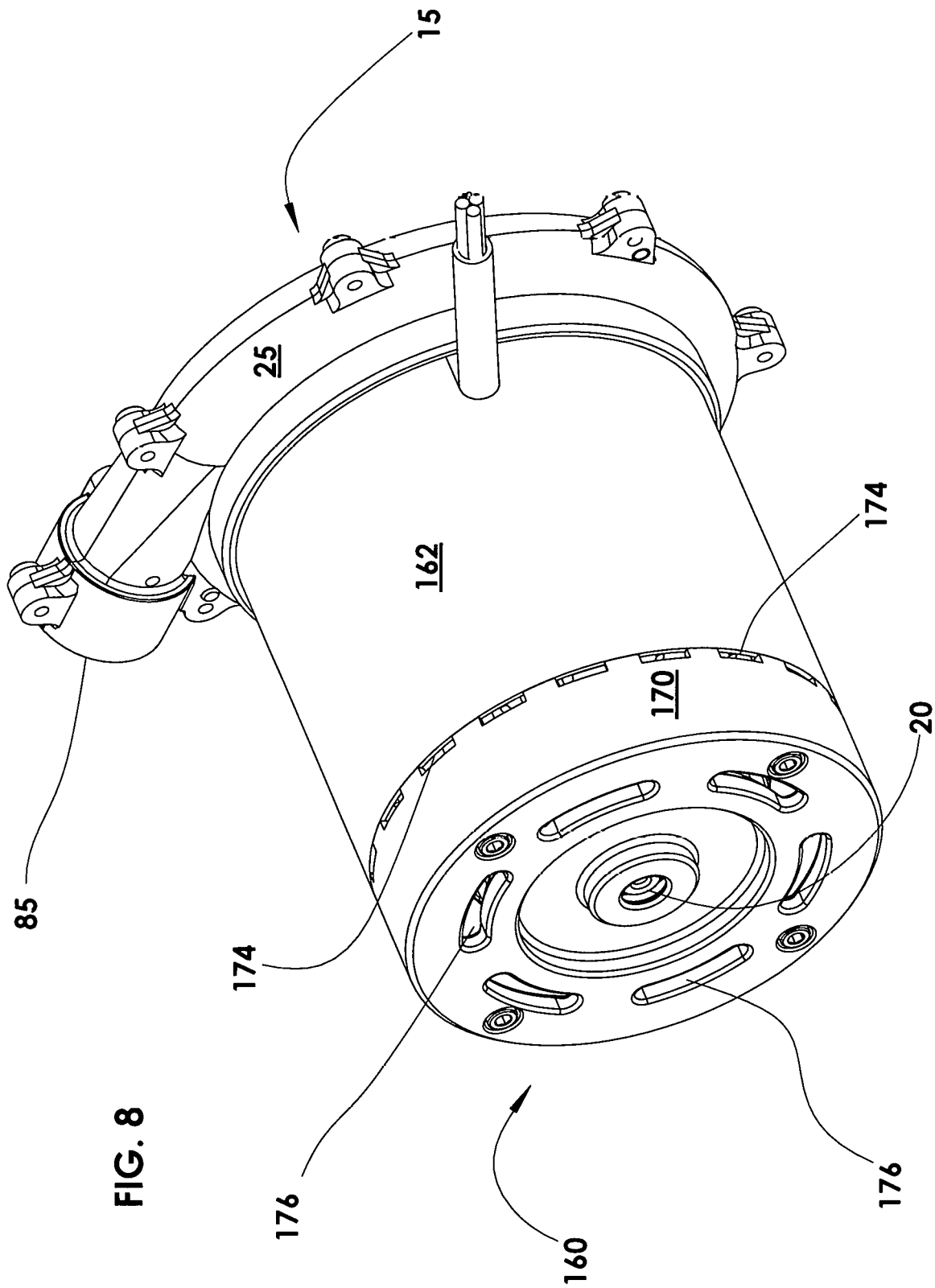
FIG. 8 comprises another perspective view of the third embodiment of the centrifugal compressor shown in FIG. 7.

Again, similar to the centrifugal compressor 10, the centrifugal compressor 160 includes an axial air inlet 15 located at a first end, and a main cooling air inlet 20 at a second end (shown in FIG. 8). Both inlets 15 and 20 are generally aligned along main axis 55. A volute 25 is coupled to the first end of the housing 162. The compressor inlet 15 receives a fluid medium, generally air, to be compressed, which is discharged as compressed fluid at volute exit 85. The inlet leads to a single centrifugal compressor stage comprised of an impeller 90 with the volute 25 surrounding the impeller 90 and the inlet 15. The volute is a curved funnel that increases in area as it approaches the volute exit 85. The volute converts kinetic energy into pressure by reducing speed while increasing pressure.

Figure 9:
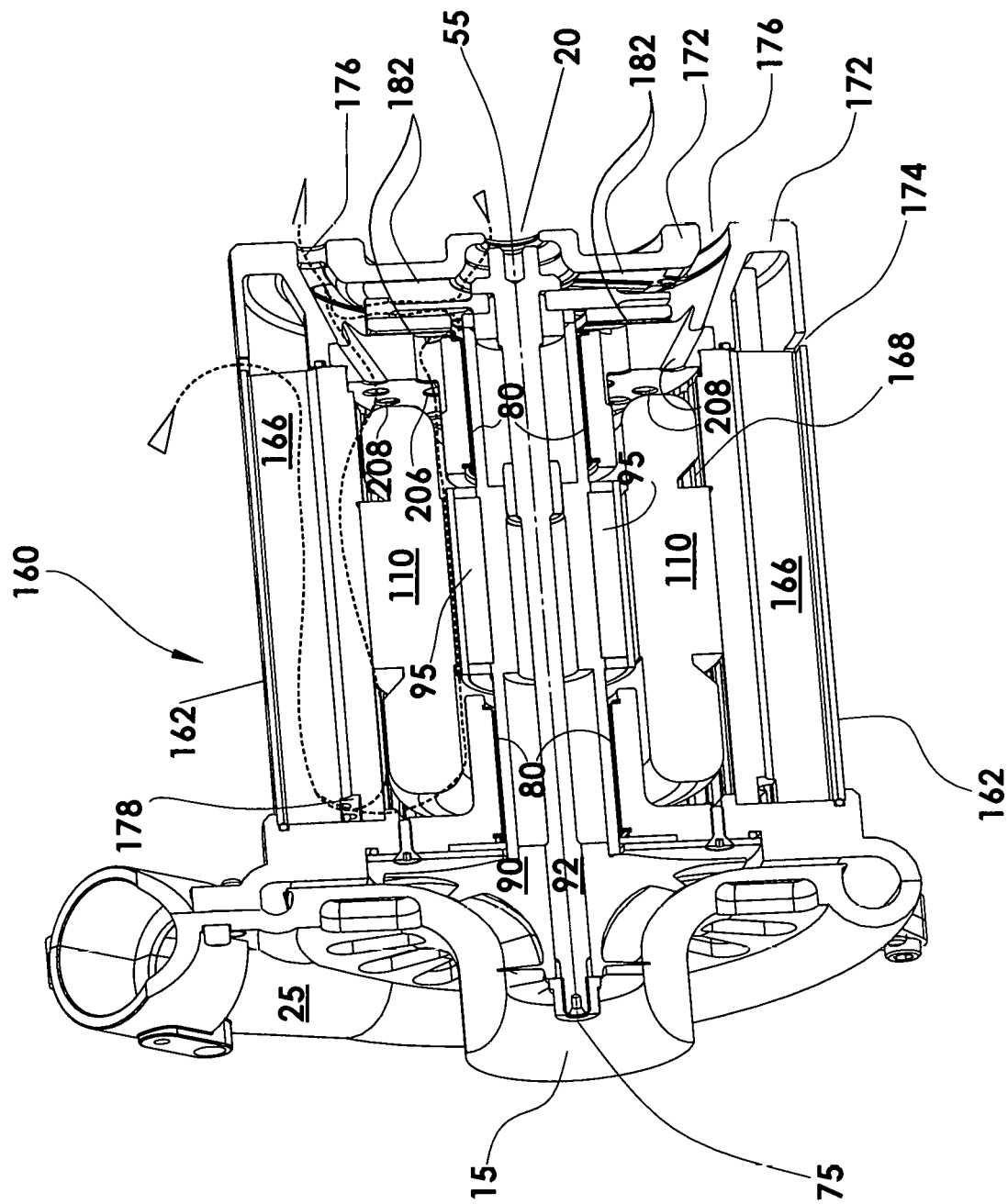
FIG. 9 comprises a cross-sectional view of the third embodiment of the centrifugal compressor shown in FIG. 7.

As shown in FIGS. 8 and 9, a rear cover 170 is located over a rear plate element 172. Both the rear cover 170 and the rear plate element 172 include an aperture that forms the main cooling air inlet 20. In contrast to the centrifugal compressor 10 that has air exit ports 130, centrifugal compressor 160 has air inlet ports 174 and air outlet ports 176.

Figure 10:
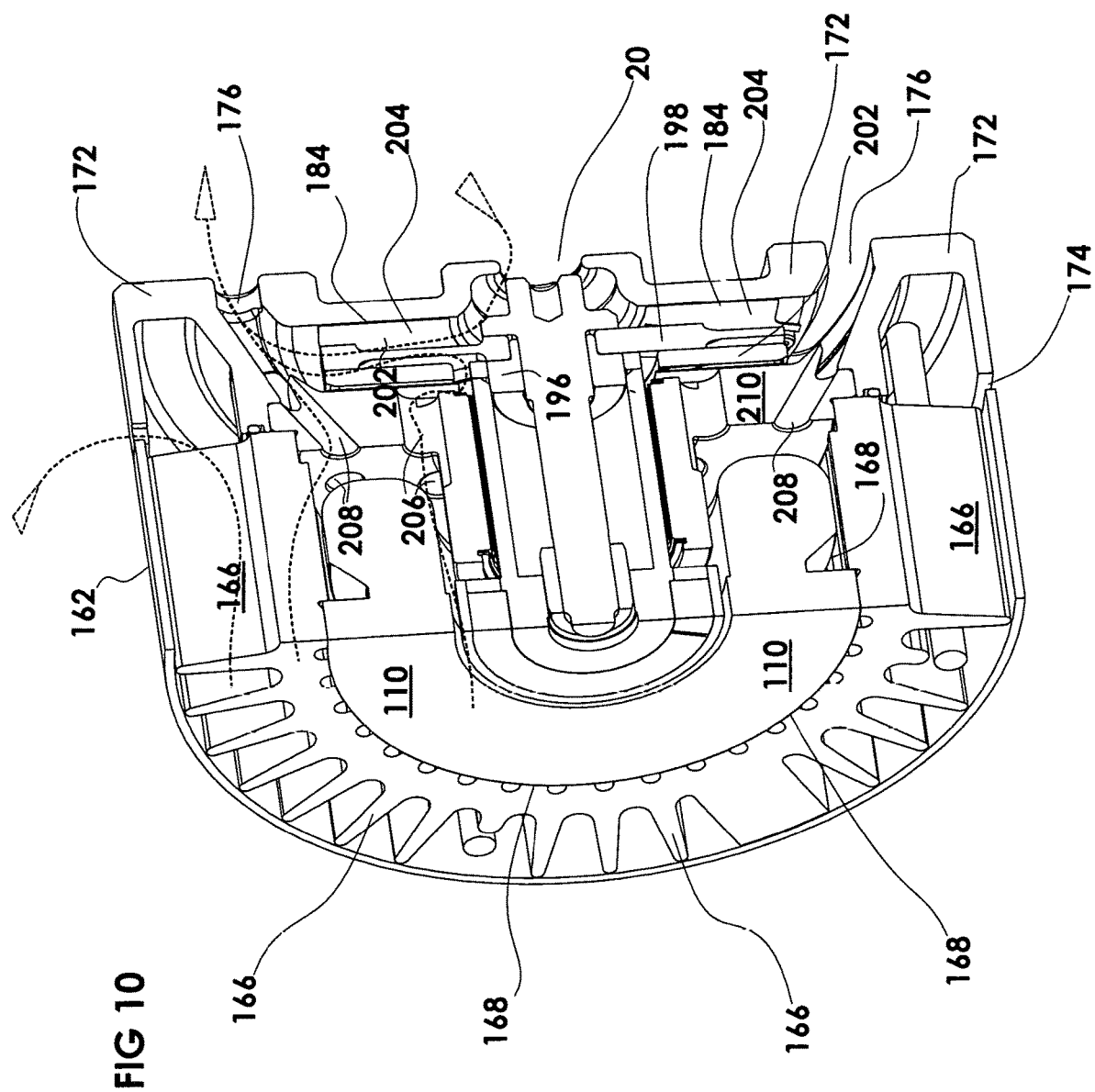
FIG. 10 comprises close-up cross-sectional view of the third embodiment of the centrifugal compressor shown in FIG. 9.

As shown in FIGS. 9 and 10, a rotating assembly, or impeller assembly 75 includes the impeller 90, a shaft 92 and a permanent magnet motor rotor 95 that are all coupled together. A first air bearing journal 80 and a second air bearing journal 80 are located on the shaft 92. As defined herein, a journal (i.e., the part of the rotating component in contact with a bearing) slides relative to the bearing surface. So, for example, the first and second air bearing journals 80 are part of the rotating assembly 75 and rotate when the centrifugal compressor 160 is in operation.

Referring now to FIG. 10, a rear bearing member 210 includes a bearing surface where radial air bearings (not shown) are mounted opposite the air bearing journals 80. This arrangement is repeated adjacent to the impeller 90, where another bearing member includes a bearing surface where radial air bearings (not shown) are mounted opposite the air bearing journals 80. The construction and operation of the radial air bearings will be described below.

Figure 13:
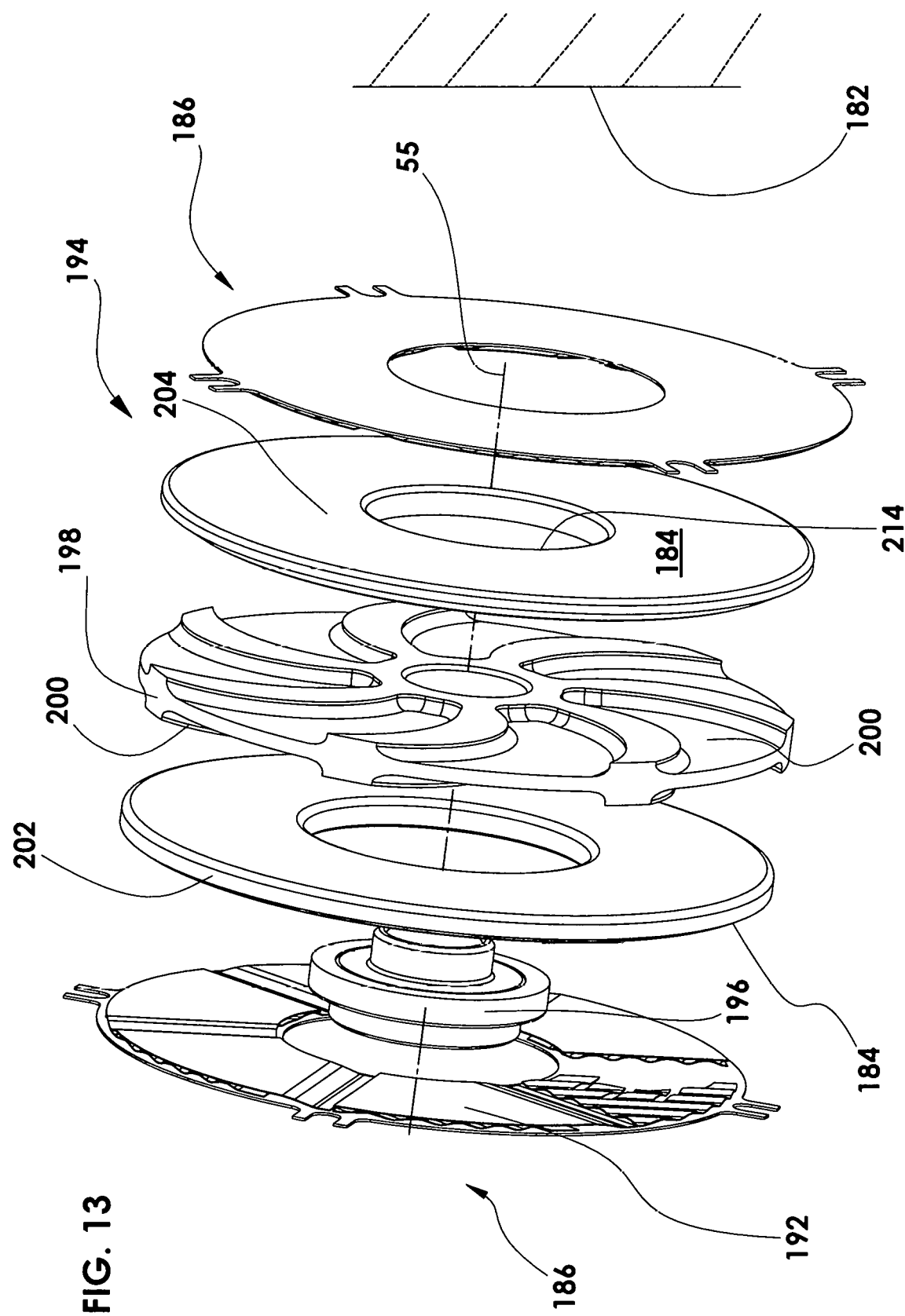
FIG. 13 comprises an exploded view of a thrust plate employed in the third embodiment of the centrifugal compressor shown in FIG. 7.

Turning now to FIG. 13, a thrust plate assembly 194 is illustrated. The thrust plate assembly 194 is also shown in FIGS. 9-10, and is located adjacent to the main cooling air inlet 20. The thrust plate assembly 194 is coupled to the shaft 92 by attaching member 196. The thrust plate assembly 194 comprises a disk shaped center element 198 having two sides and a plurality of grooves 200 located on both of the two sides, with each groove 200 extending in a substantially radial direction. Positioned on one side of the center element 198 is a front disk 202, and on the other side of the center element 198 is a rear disk 204. As shown in FIGS. 9-10, the front and rear disks 202 and 204 are positioned on each side of the center element 198 so that the plurality of grooves 200 are covered to form a plurality of channels.

Because air bearings are employed in the present invention, the shaft 92 is free to move along the main axis 55. Air bearings employ a thin film of air to provide an exceedingly low friction load-bearing interface between surfaces, for example, between the rear bearing member 210 and the shaft 92. The two surfaces do not touch during operation. Specifically, once the rotating assembly 75 is spinning quickly enough, the working fluid (air) pushes the air bearings (located between the rear bearing member 210 and the shaft 92) away from the shaft 92 so that there is no more contact.

During operation, when the shaft 92 is rotating, the impeller 90 generates an axial force that pulls the shaft 92 toward the front of the centrifugal compressor 160 (i.e., toward the axial air inlet 15). The thrust plate assembly 194 includes thrust plate journals 184 that resist that force (shown in FIGS. 9-13). As defined herein, a thrust plate counteracts, or responds to, forces acting axial to a shaft. In the illustrated embodiment, the thrust plate assembly 194 is mounted adjacent to thrust plate bearing surfaces 182 that are included on the rear bearing member 210 and the rear plate element 172 (shown in FIGS. 9-10 and 13).

Figure 11:
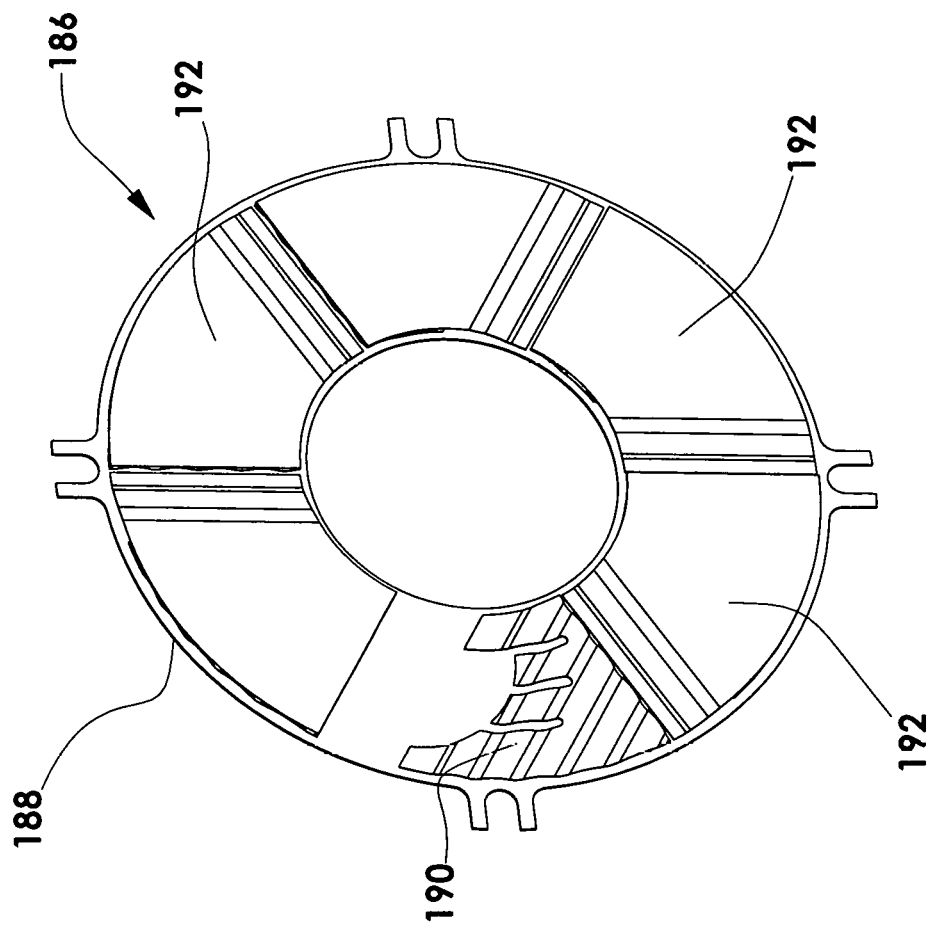
FIG. 11 comprises a view of an air bearing employed in the third embodiment of the centrifugal compressor shown in FIG. 7.
Figure 12:
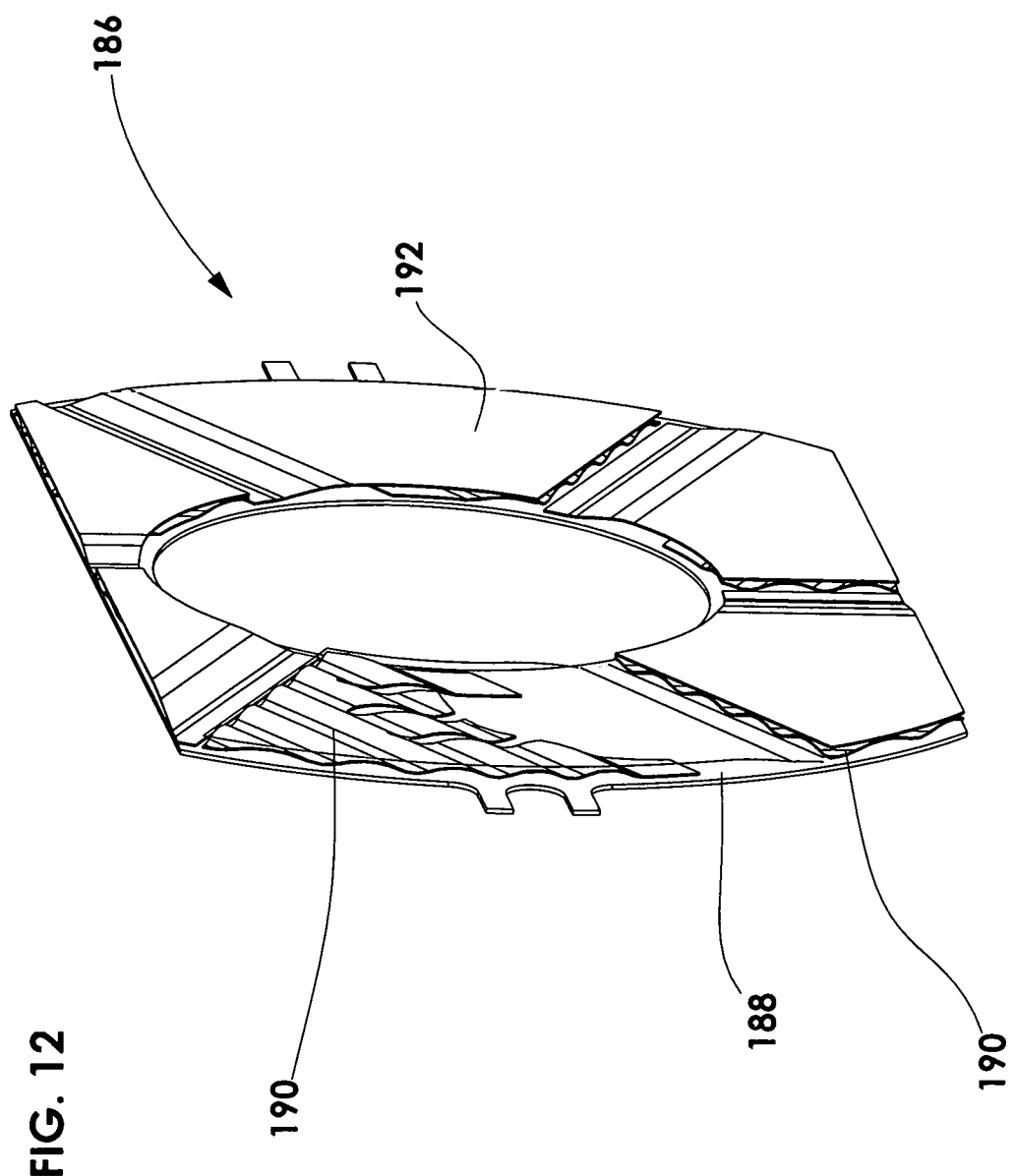
FIG. 12 comprises a close-up perspective view of the air bearing shown in FIG. 11.

Shown in FIGS. 11-12, two axial air bearings 186 are attached to thrust plate bearing surfaces 182, thereby minimizing friction forces between the thrust plate journals 184 and the thrust plate bearing surfaces 182. Thrust plates are generally not required in devices that do not employ air bearings, as the rotating shaft is fixed along its rotational axis by conventional roller bearings, or other types of contact bearings.

Referring again to FIGS. 11-12, the axial air bearings 186 are comprised of a mounting plate 188 with a spring element 190 attached to the mounting plate 188. Attached to the spring element 190 is a bearing plate 192 that faces the thrust plate journals 184. In a preferred embodiment, a low friction material, such as polytetrafluoroethylene (PTFE), is applied to the bearing plate 192. The radial air bearings mounted opposite the air bearing journals 80 are constructed similarly, but are curved to match the curvature of the shaft 92. Air reaches the radial air bearings through holes (not shown) in the rear bearing member 210 and the bearing member located adjacent to the impeller 90. Air flow to the axial air bearings 186 is described below.

Figure 14:
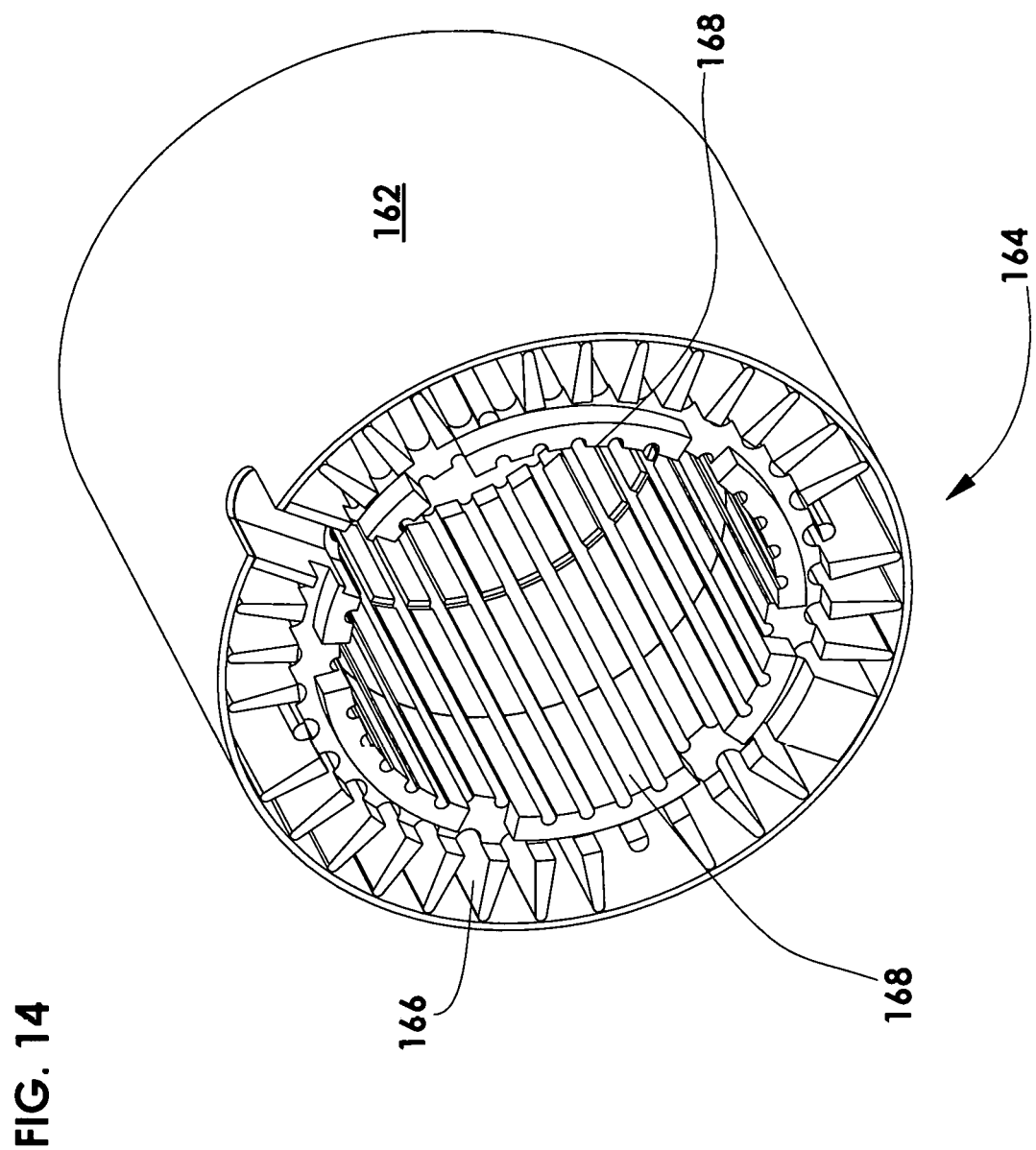
FIG. 14 comprises a perspective view of a heat exchange element employed in the third embodiment of the centrifugal compressor shown in FIG. 7.

Moving to FIG. 14, positioned within the housing 162 is a heat exchange element 164 comprising a plurality of outer fin elements 166 and inner fin elements 168. Similar to centrifugal compressor 10, a stator 110 is fixedly retained within the heat exchange element 164 (shown in FIG. 9). Specifically, the stator 110 is coupled to the distal ends of the inner fin elements 168, with each distal end of the inner fin element 168 forming a slender contact line with the stator 110. This allows air to pass between each inner fin element 168, thereby cooling the stator 110, as described in detail below. A motor rotor 95 (shown in FIG. 9) that acts as an armature of an electrically driven permanent magnet is coupled to the rotating assembly 75, thereby forming a high speed electric motor with the stator 110.

The air cooling features of the centrifugal compressor 160 will now be discussed. The centrifugal compressor 160 incorporates several different air cooling features. First, one unique feature of centrifugal compressor 160 is the main cooling air inlet located at the rear of the housing 162. In addition, the housing 162 includes a plurality of air inlet ports 174 located in the rear cover 170, and several air outlet ports 176 also located in the rear cover 170. As discussed above, the centrifugal compressor 160 includes a first air inlet, or compressor air inlet 15 where air (preferably at ambient pressure, but may also be introduced at a non-ambient pressure) enters, contacts the impeller 90, which, in conjunction with the volute 25, increases its pressure. This pressurized air then exits at the volute exit 85. This air is used for any number of applications, ranging from aviation to automotive to industrial applications.

Figure 15:
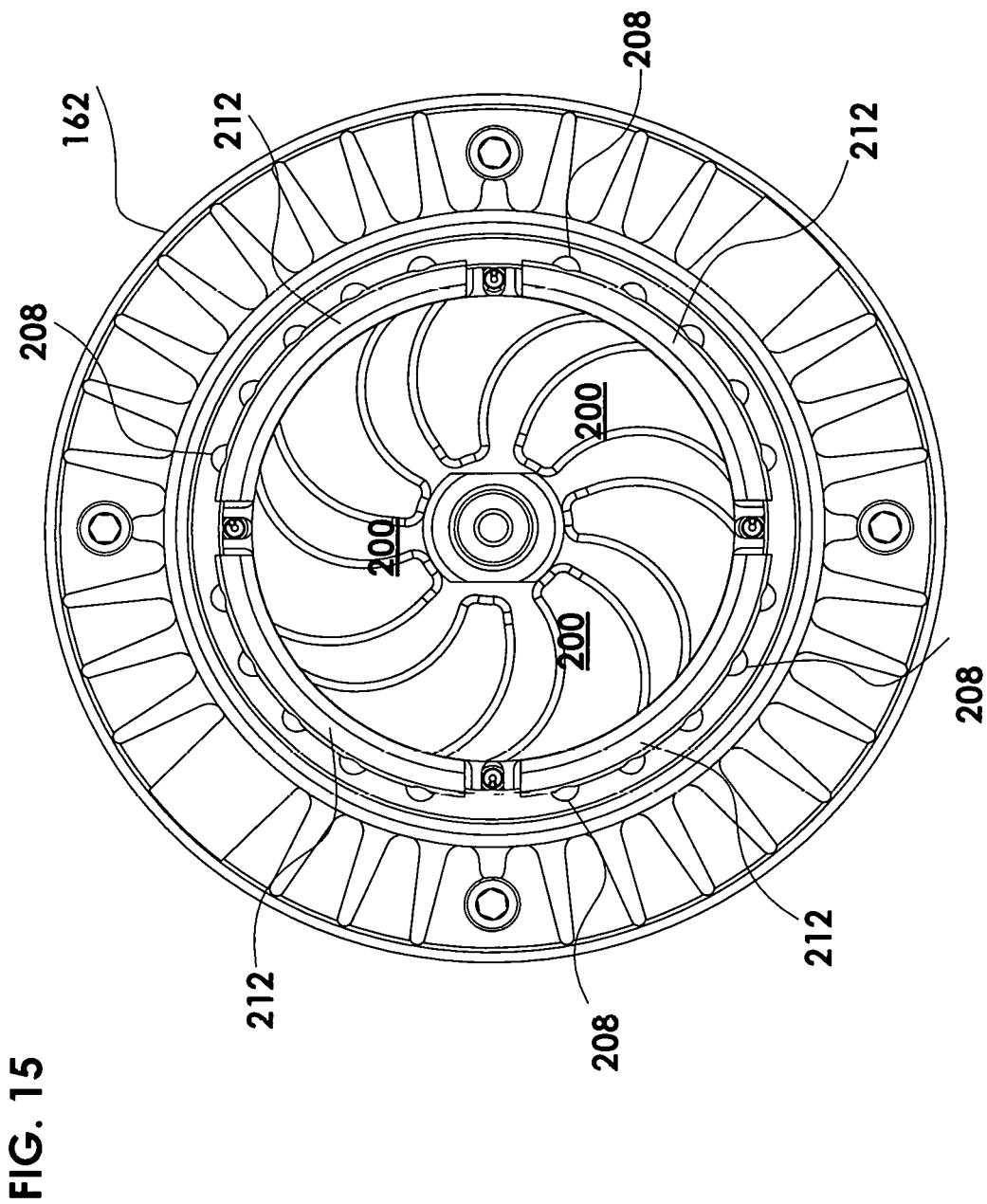
FIG. 15 is a rear elevation view of the third embodiment of the centrifugal compressor shown in FIG. 7, showing elements of the thrust plate illustrated in FIG. 13.
Figure 16:
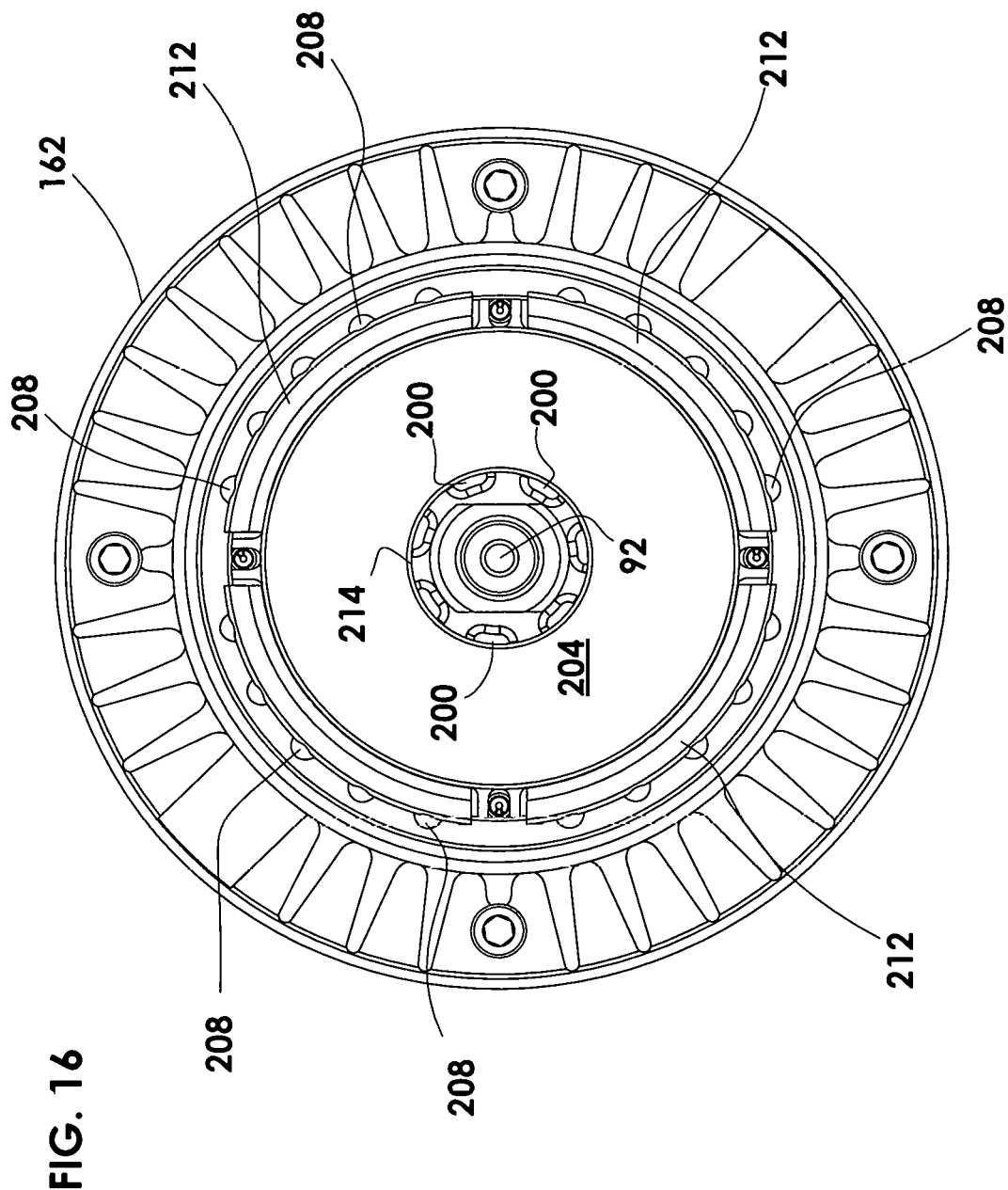
FIG. 16 is a rear elevation view of the third embodiment of the centrifugal compressor shown in FIG. 7, showing elements of the thrust plate illustrated in FIG. 13.
Figure 17:
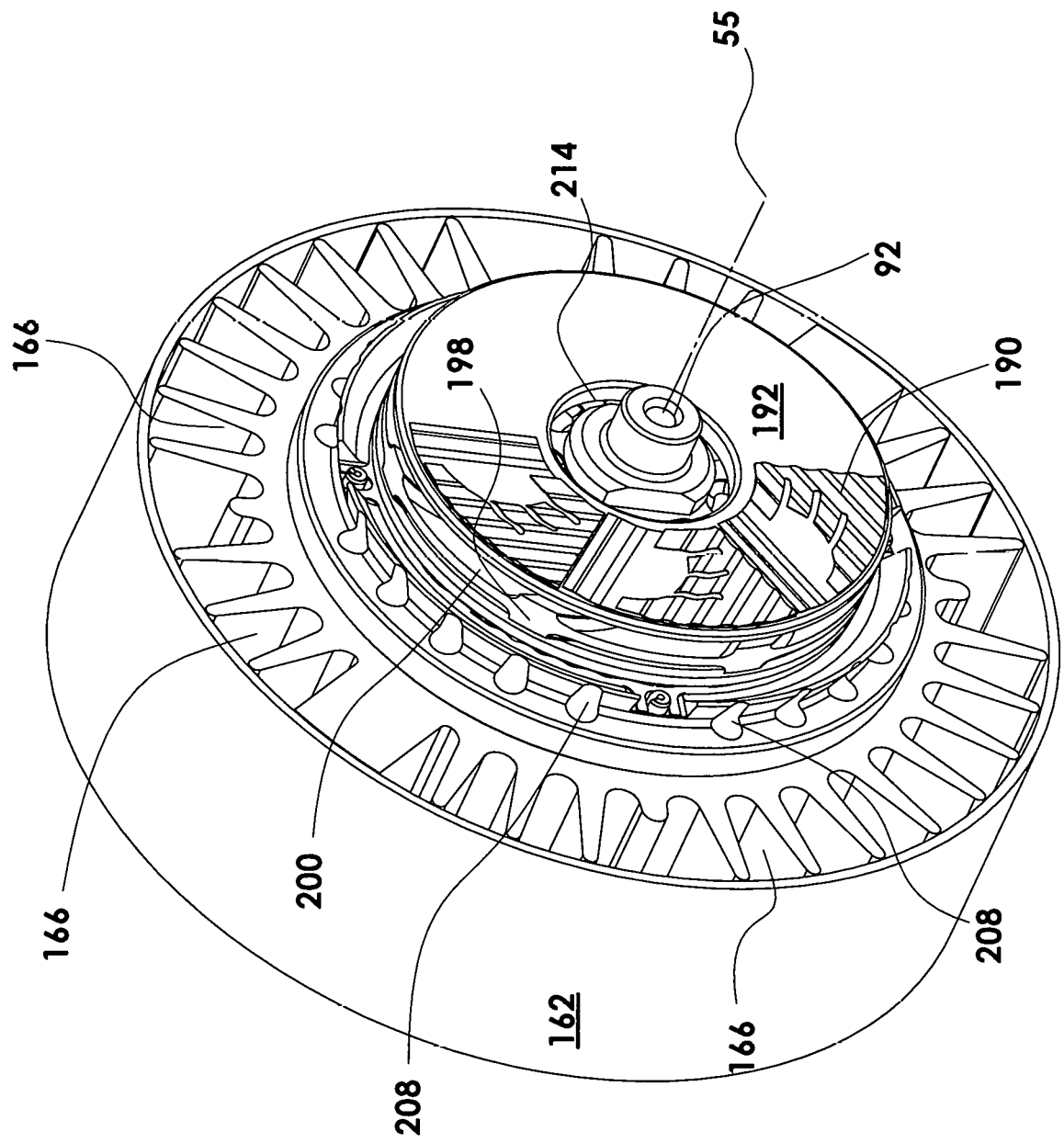
FIG. 17 is a perspective view of the third embodiment of the centrifugal compressor shown in FIG. 7, showing elements of the thrust plate illustrated in FIG. 13.

As shown in FIGS. 8-10, the air inlet 20 also receives air (preferably at ambient pressure, but may also be introduced at a non-ambient pressure) that is pulled into the air inlet 20 by the rotation of the thrust plate 194. This novel feature is accomplished by the grooves 200 located in the thrust plate 194, shown in FIGS. 13 and 15-17. FIG. 15 is a rear elevation view with the rear cover 170, rear plate element 172 and the rear disk 204 removed. As the thrust plate 194 rotates counterclockwise, energy is transferred to the air (shown by arrows) that is located in the grooves 200, ejecting it out at the perimeter of the thrust plate 194. As the thrust plate 194 continues to rotate, more air is drawn into the air inlet 20, through the grooves 200, and out at the perimeter of the thrust plate 194. This creates a lower air pressure the air inlet 20. FIG. 16 is also a rear elevation view with the rear cover 170 and rear plate element 172 removed. Rear disk 204 is illustrated, with circular opening 214 shown, through with air from the inlet 20 passes (also shown in FIG. 13). FIG. 17 is a perspective view with the rear cover 170 and rear plate element 172 removed. Air bearing 192 is shown with the center element 198 and grooves 200 illustrated. Also, circular opening 214 shown, through with air from the inlet 20 passes (also shown in FIGS. 13 and 16).

Because of the lower air pressure created by the thrust plate 194, air is also drawn into apertures 174 located in the housing 162 (shown in FIGS. 7-10). Illustrated in FIGS. 9-10, this air (shown by arrows) is directed between the outer fin elements 166 of the heat exchanger 164 toward the front of the compressor 160. It then passes through small cut-outs 178 where it then turns back toward the rear of the compressor 160 and passes between the inner fin elements 168. In this way, the stator 110 receives cooling air on both sides—the side adjacent to the motor rotor 95, and the side where it is attached to the inner fin elements 168.

Figure 18:
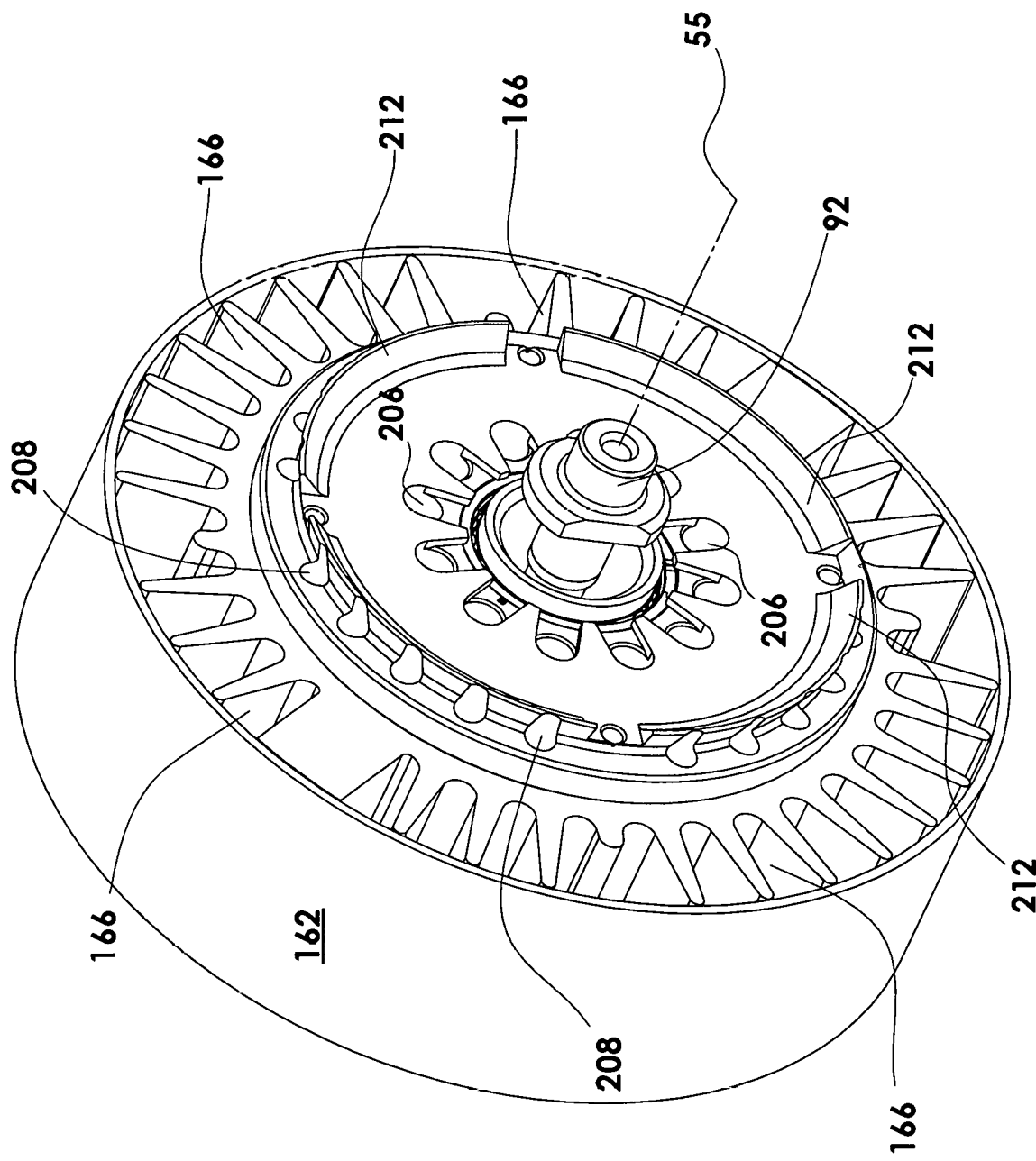
FIG. 18 is a perspective view of the third embodiment of the centrifugal compressor shown in FIG. 7, with the thrust plate removed, showing air passageways.

Referring now to FIGS. 9-10 and 18, which is a perspective view with the rear cover 170, rear plate element 172, and thrust plate 194 removed. Once the air has passed over the stator 110, it then exits through inner slots 206 and outer slots 208 located in the rear bearing member 210. As discussed above, the rear bearing member 210 includes a thrust plate bearing surface 182 to which the axial air bearings 186 are mounted.

As shown in FIGS. 10, 17-18, as air exits outer slots 208, it passes along ramp 212 located on the rear bearing member 210. Ramp 212 is a flange comprised of curved sections, as shown in FIG. 18. Referring now to FIG. 17, as the thrust plate assembly 194 rotates, air passes through grooves 200 and is ejected radially outward creating a lower air pressure on the side of the ramp 212 adjacent to the outer slots 208. This lower air pressure draws air from the grooves 200. As shown in FIGS. 9 and 10, the air exits outer slots 208, passing over the outer side of the ramp 212. The air then exits through air outlet ports 176.

Air flowing through the inner slots 206 exits along the thrust plate bearing surface 182 and along the air bearings 186 mounted on the thrust plate bearing surface 182. It then contacts the ramp 212 and exits through air outlet ports 176.

Figure 19:
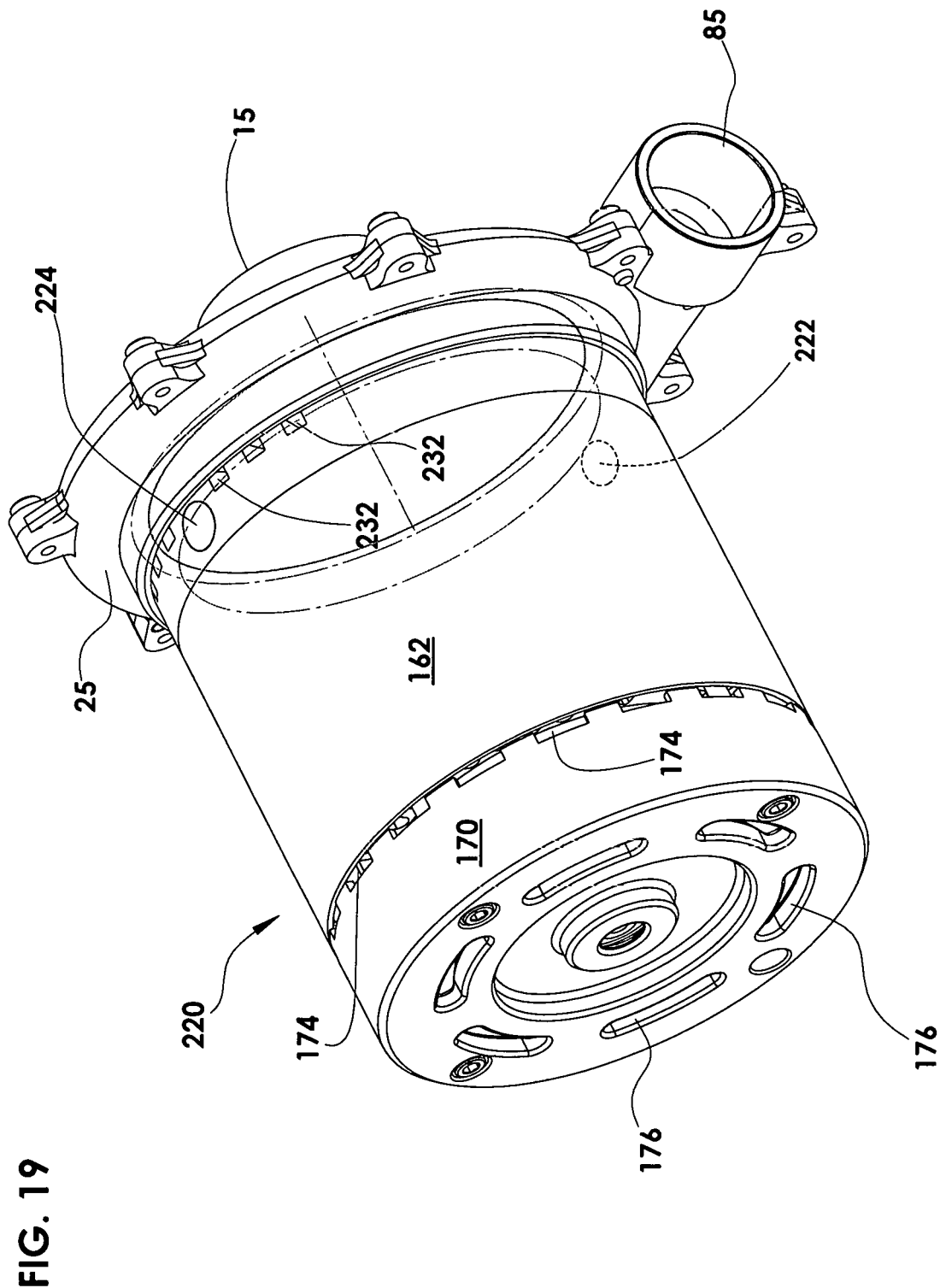
FIG. 19 is a perspective view of a fourth embodiment of the centrifugal compressor, the fourth embodiment comprising a fluid-cooled centrifugal compressor.
Figure 20:
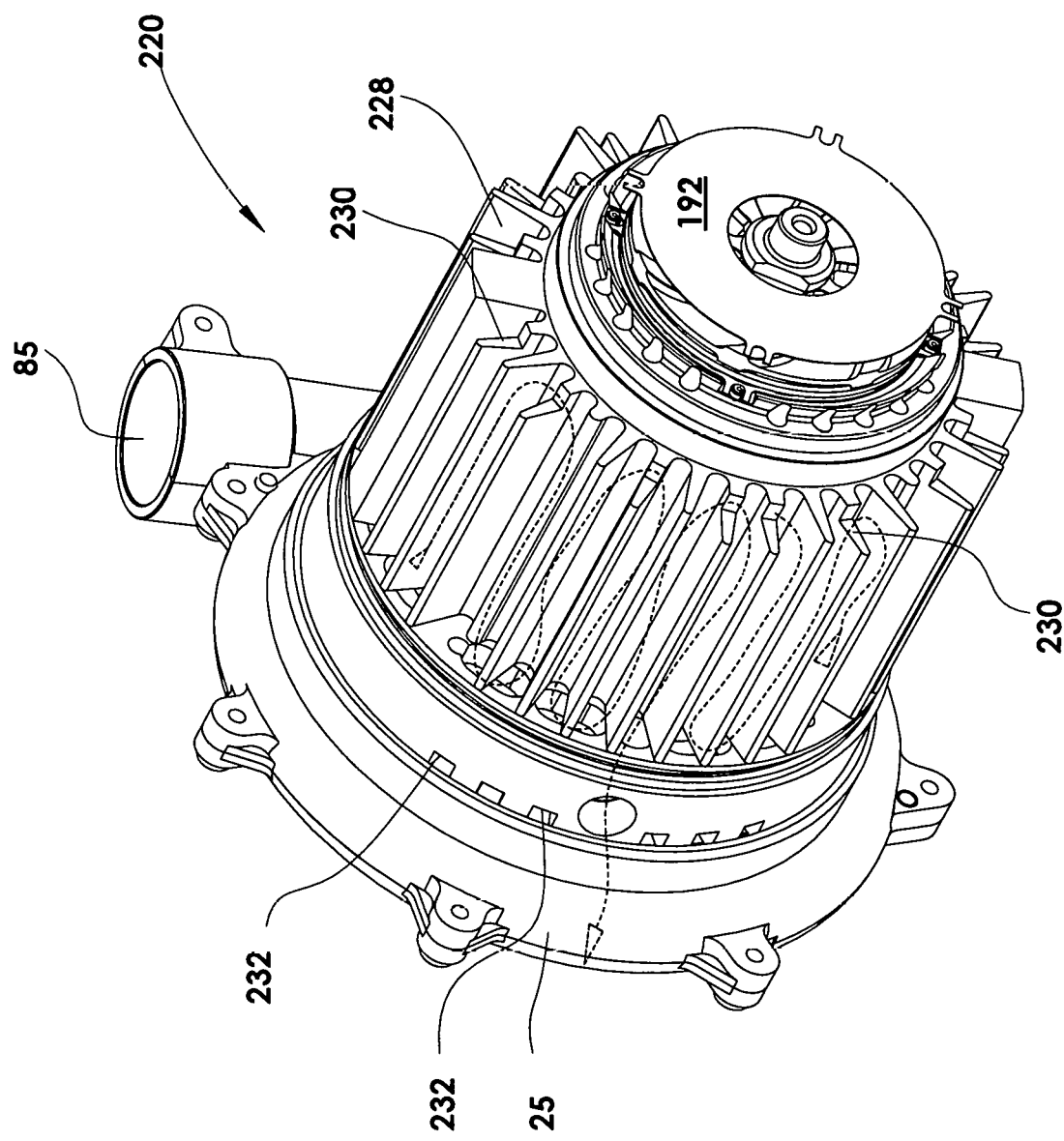
FIG. 20 is a perspective view of a fourth embodiment of the centrifugal compressor, shown in FIG. 19, with an outer housing cover removed.
Figure 21:
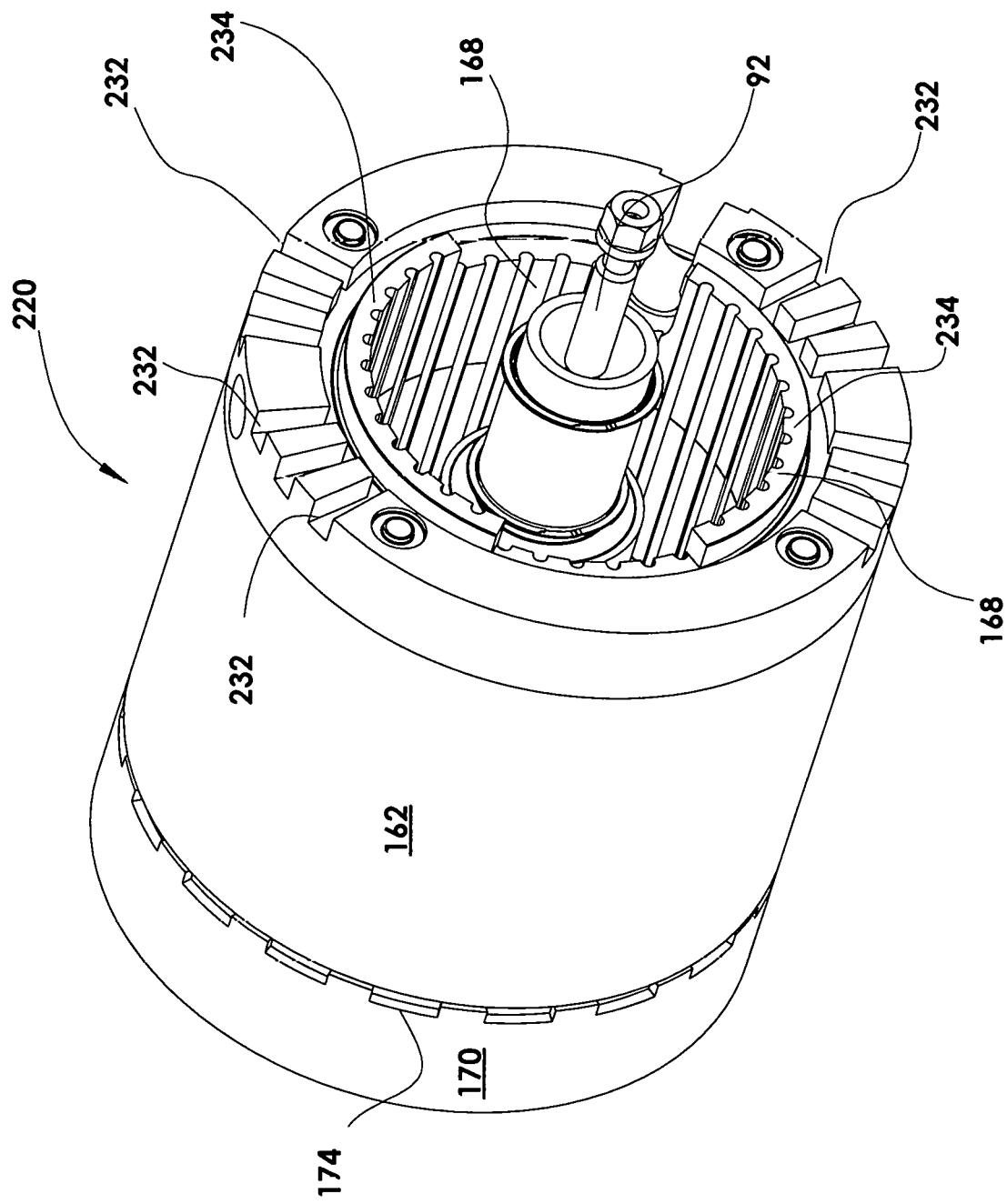
FIG. 21 is a perspective view of a fourth embodiment of the centrifugal compressor, shown in FIG. 19, with the volute removed.

Turning now to FIGS. 19-21, a fourth embodiment centrifugal compressor 220 that includes water cooling in addition to air cooling is illustrated. The housing 162 includes a liquid cooling inlet 222 and liquid cooling outlet 224 for circulating a liquid cooling medium through a liquid heat exchanger. Liquid, such as water or another fluid, enters the inlet 222, and circulates back-and-forth around the fins 228, shown by the arrows. The fins 228 include cut sections 230 that allow the liquid to wrap around each fin 228. The liquid then exits at outlet 224. Front air inlets 232 bring air into the compressor 220, which flows between the inner fin elements 168, as described above in connection with compressor 160. Air is drawn into the front air inlets 232 for the same reason it is drawn into air inlet ports 174, as also described above in connection with compressor 160.

FIG. 21 also illustrates a shoulder 234 that prevents the emission of electromagnetic radiation from front air inlets 232. Electromagnetic radiation is produced by the stator 110, and may cause interference with devices located near the compressor 220. However, electromagnetic radiation travels in a straight line, and thus the shoulder 234 blocks any emission from escaping out the front air inlets 232.

Not illustrated is an electronic module. The electronic module controls the centrifugal compressors 160 and 220 through use of sensors (such as a Hall effect sensor) or software and other elements as required. For example, the electronic module may include computer hardware and software and may include a computer program product which is embodied on one or more computer-usable storage media having computer-usable program code embodied therein. Computer program instructions may also be stored in a computer-readable memory that can direct the centrifugal compressors 160 and 220 to function in a particular manner, such that the instructions stored in the computer-readable memory produce a compressor operating cycle.

Figure 22:
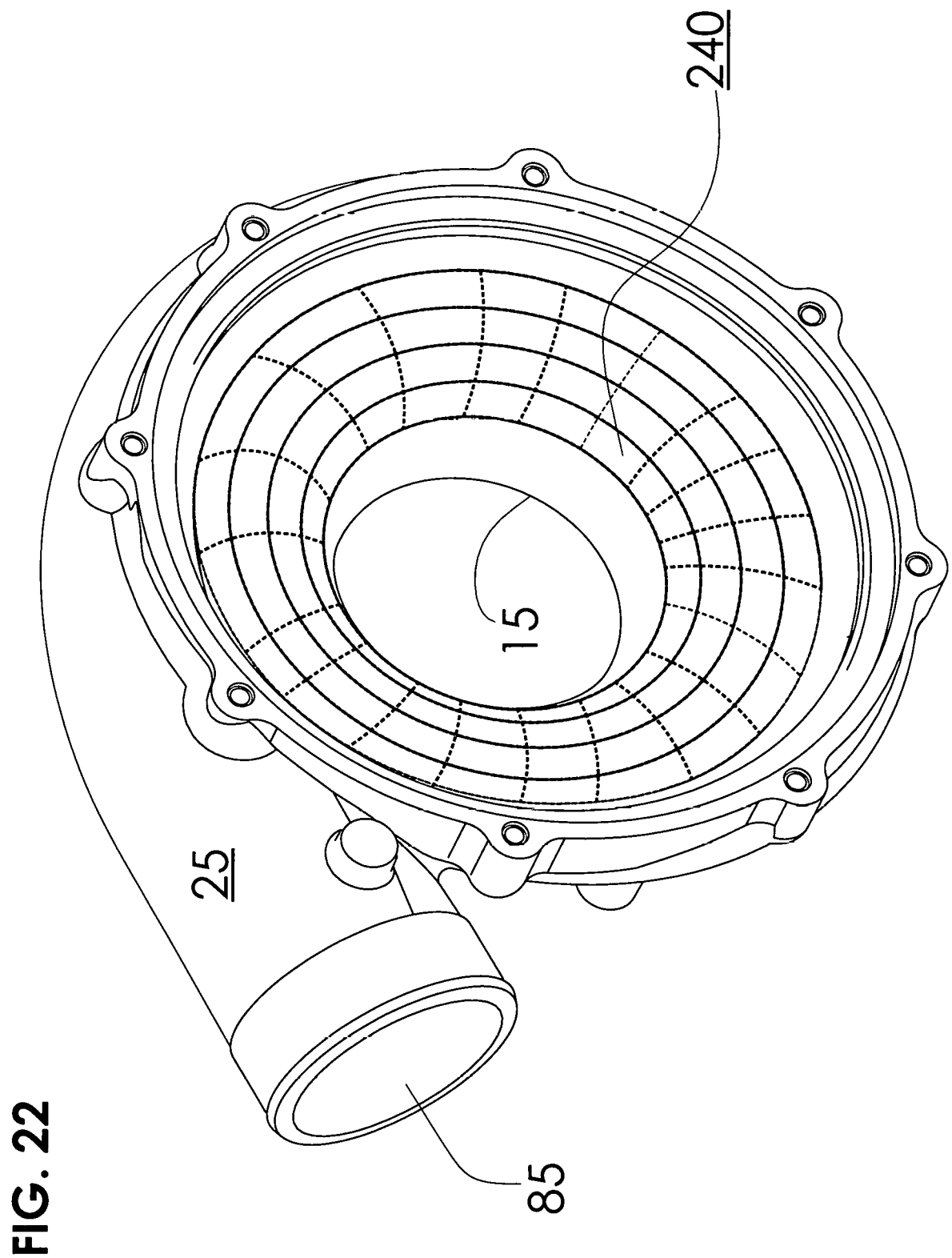
FIG. 22 is a perspective view of a portion of a volute employed on the third and fourth embodiments of the centrifugal compressor.

Referring now to FIG. 22, the centrifugal compressors 160 and 220 may also include a clearance reducing system (CRS) that has many novel features including, among others, the ability to manufacture turbomachinery components having higher efficiencies and longer lifespans than conventional turbomachinery components. In addition, the CRS is inexpensive to manufacture, and when ingested by turbomachinery components, or any other downstream components, the CRS will cause no damage.

In one embodiment, the CRS comprises a relatively soft coating 240 (shown in FIG. 22) as compared to the impeller 90 or volute 25. The CRS can be used as a gap reduction material for reducing clearances between moving components. For example, the CRS may be applied to the inner surface of the volute 25 (as shown in FIG. 22), opposite the impeller 90, enabling a smaller gap between the two components. As the gap between the blades of the impeller 90 and the volute inner surface affects the overall performance of the compressor, a reduced gap increases efficiency. The CRS also provides a low-friction surface and is resistant to solvents and oils.

As shown in FIG. 22, an interior view of the volute 25 is illustrated. It includes a curved, annular surface that is located opposite the blades of the impeller 90 (shown in FIG. 9). Coating 240 is located on the curved, annular surface. In one embodiment, the coating 240 comprises a mixture of a polymer and a filler. Polymers are large molecules, or macromolecules, composed of many repeated subunits. In a preferred embodiment, a thermosetting polyimide polymer resin is employed, having a density that can range from 1 to 1.5 grams per cubic centimeter. In this embodiment, P84 polyimide moulding powder is employed, manufactured by HP Polymer GmbH. In other embodiments, an epoxy resin or a silicone resin may be employed.

The second component of the coating 240 is a filler, which may be comprised of a polytetrafluoroethylene (PTFE), or organic powders such as cellulose or other powders comprised of organic material, or walnut shells or other non-metallic, non-alloy and non-ceramic elements. As defined herein, a filler is a component that takes up space but does not provide any structural strength. That is, if the filler was removed, the structural strength (i.e., tensile strength) of the mixture would remain substantially the same or possibly increase. In contrast, in a case where a filler provides structural strength, removal of the filler results in a decrease of the tensile strength of the mixture.

In a preferred embodiment, PTFE is employed as the second component of the coating 240, in the form of a fluorocarbon solid having a density that can range from 2 to 3 grams per cubic centimeter. In this embodiment, FLON-3610 manufactured by Flontech USA of Pittston, Pa. is used. One feature of PTFE is that it has one of the lowest coefficients of friction of any solid and is also very non-reactive. For example, the coefficient of friction of PTFE may be about 0.04. The coefficient of friction is the ratio of the frictional force divided by the normal force. The coefficient of friction has no units of measure (force divided by force). When compared to materials used in conventional abradable coatings, the coefficient of friction of PTFE is significantly lower. For example, the coefficient of friction of aluminum may range from 1.05 to 1.35. The coefficient of friction of carbon may range from 0.14 to 0.16. The coefficient of friction of steel may range from 0.5 to 0.8. The low coefficient of friction of PTFE in the present invention provides an advantage when compared to conventional abradable coatings.

In one embodiment, the coating 240 is manufactured by generating a first mixture comprising polytetrafluoroethylene (PTFE) and a solvent, where the PTFE is added to the solvent and then the mixture is agitated resulting in a heterogeneous mixture of PTFE and the solvent. A second mixture is then generated, the second mixture comprising a polymer and the solvent, where the polymer is added to the solvent and then the mixture is agitated resulting in a homogeneous mixture. A final mixture is then produced by adding the first mixture to the second mixture, where a weight of the PTFE added to the second mixture can range from 30% more to 30% less than a weight of the second mixture.

Several solvents may be employed, including N-Methyl-2-pyrrolidone (NMP), methyl ethyl ketone (MEK), butanone, benzene, toluene, and others. In a preferred embodiment, NMP is employed, which is an organic compound and is miscible with water and with most common organic solvents. NMP is a common paint solvent readily available from chemical supply houses such as Ashland Chemical.

In a preferred embodiment, the first mixture of PTFE and the NMP solvent are prepared by adding PTFE particles to the liquid NMP solvent. The PTFE particles may range in size from 150 microns to 400 microns. Agitation of the solution allows the PTFE particles to separate and create a uniform particulate distribution. By weight preparation of the PTFE and the NMP solvent is made by mixing 28 grams (1 ounce) of PTFE particles added to 8.3 (0.3 ounces) grams of NMP.

In a separate container, preparation of the polymer, the polyimide moulding powder discussed above and the NMP solvent is made by mixing by weight for a 30% polyimide to NMP solvent ratio. Allowing this solution to sit overnight will allow the polyimide powder to dissolve completely in the NMP solvent resulting in a homogenous solution. By weight preparation of the polyimide powder and the NMP solvent is made by mixing 6 grams (0.21 ounces) of polyimide powder to 14 grams (0.5 ounces) of NMP to create the solution.

Finally, the first mixture of NMP and PTFE (a heterogeneous mixture) is added to the second mixture of NMP and polyimide powder (a homogenous mixture) resulting in the coating 240. The heterogeneous PTFE mixture is mixed in at a 1:1 ratio by weight with the homogenous polyimide solution. For example, for each 28 grams of polyimide solution, 28 grams of PTFE is mixed in. That is, a weight of the PTFE added is equivalent to a weight of the second homogenous solution. It will be appreciated that other mixture amounts may be employed. For example, a weight of the PTFE added to the second homogenous mixture can range from 30% more to 30% less than a weight of the second homogenous mixture. Put differently, the amount of PTFE in the mixture may range from 30% by weight up to 70% by weight of the total mixture. Alternate percentages of the given materials will provide for slightly different characteristics of toughness and scrape-ability. The homogenous polyimide solution will become thicker with more PTFE powder mixed in. At 33% PTFE powder to NMP solvent the material will be very thick, with the cured material being thicker and it is more difficult to mix in the filler material, in this case PTFE. With a thicker material the final mixture is paste-like, enabling application by brush or spatula. A thinner homogenous solution of polyimide and NMP, such as 10% by weight will result in a final material that is easier to "scrape off" a surface the mixture is applied to. This thinner mixture will absorb the PTFE more readily and a paint spay gun may be employed to apply the mixture to a surface.

It will also be appreciated that the above-discussed amounts can be "scaled up" to create larger batches of mixture. An optional embodiment coating 240 mixture may also include carbon black, used as a color pigment. Carbon black is a material produced by the incomplete combustion of heavy petroleum products such as FCC tar, coal tar, ethylene cracking tar, and a small amount from vegetable oil, and is commonly available.

The coating 240 is then applied to the curved, annular surface of the volute 25, as shown in FIG. 22. In a preferred embodiment, the coating 240 is applied by spraying, similar to spraying paint or applying a texture coating. Other embodiments of the coating 240 may be applied by "squeegee," brushing or other methods. The volute 25 is preheated to approximately 200-300 degrees Fahrenheit, then a layer of the coating 240 is sprayed onto the curved, annular surface of the volute 25 and allowed to dry, during which some of the NMP solvent evaporates. This results in a partially cured layer, allowing another layer of the coating 240 to be applied. Each layer is several thousands of an inch thick. Once the desired thickness is achieved, the coating 240 is cured in an oven at 500 degrees Fahrenheit. One feature of the present invention is that the temperature that the coating 240 can withstand is directly related to the final curing temperature. For example, if the final curing temperature is 500 degrees Fahrenheit, then the coating 240 can withstand 500 degrees Fahrenheit in service. The final curing temperature can go up to 650 degrees Fahrenheit.

An applied thickness of the coating 240 can vary depending upon the application. For example, in the illustrated embodiment shown in FIG. 22, the coating 240 may have a thickness ranging from 0.003 to 0.050 of an inch. One advantage of the present invention is that with the application of the coating 240, the space between the impeller blades and the volute can be reduced. For example, in a conventional centrifugal compressor that does not have a coating 240, the space between the impeller blades and the volute can range from 0.025 of an inch to 0.045 of an inch. With the coating 240 installed, the space from the impeller blades to the volute can be decreased down to 0.005 of an inch.

Generally, with the coating 240 installed the impeller blades will scrape, or erode the coating 240 during initial operation, enabling the manufacture of a centrifugal compressor 160 or 220 having smaller gaps, or clearances between the impeller blades and the volute than conventional centrifugal compressors. The smaller the space or gap between the moving and non-moving parts the higher the efficiency of the turbomachinery.

In contrast to conventional ablative coating systems that use exotic materials such as carbon fiber and ceramics, the materials used for the CRS are low cost and easy to obtain. In addition, conventional ablative coating systems require exotic manufacturing methods, such as vapor deposition, plasma spray coating and autoclaves. The CRS can be applied using a convention paint spray gun, or other simple methods It is to be noted that the term "comprising", used in the claims, should not be interpreted as being limitative to the elements listed thereafter. Thus, the scope of the expression "an apparatus comprising A and B" should not be limited to devices consisting only of components A and B. It means that with respect to the present invention, the only relevant components of the apparatus are A and B.

Similarly, it is to be noted that the term "coupled", also used in the claims, should not be interpreted as being limitative to a fixed or direct connection only. Thus, the scope of the expression "A element coupled to B element" should not be limited to arrangements where A is unmovably fixed to B, or that A is directly in contact with B. It means that A may move relative to B or that other elements may be positioned between A and B.

The terms "an embodiment", "embodiment", and "a preferred embodiment", mean "one or more (but not all) embodiments of the present invention(s)" unless expressly specified otherwise. The terms "including", "comprising" and variations thereof mean "including but not limited to", unless expressly specified otherwise. The terms "a", "an" and "the" mean "one or more", unless expressly specified otherwise.

Thus, it is seen that a centrifugal compressor is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. An apparatus, comprising:
  a housing;
  a volute coupled to the housing;
  a rotatable assembly mounted within the housing, the rotatable assembly comprising a shaft with an impeller coupled to the shaft;
  a first air inlet located at a first end of the apparatus, the first air inlet providing a first air source;
  a second air inlet located at a second end of the apparatus, the second air inlet providing a second air source; and
  a thrust plate coupled to the rotatable assembly, the thrust plate comprising a disk-shaped center element having two sides and a plurality of grooves located on at least one of the two sides, and two disk-shaped outer elements, with one outer element positioned on each side of the center element, with all three elements coupled to the rotatable assembly so that the three elements rotate with the rotatable assembly.

2. The apparatus of claim 1, where the at least one interior channel comprises a groove extending in a substantially radial direction inside the thrust plate with an inlet located adjacent to a rotational axis of the shaft and an outlet located at a perimeter of the thrust plate.

3. The apparatus of claim 1, where air enters the second air inlet, passes though the at least one interior channel in the thrust plate, and then exits the apparatus though an aperture located in the second end of the apparatus.

4. The apparatus of claim 1, further comprising a motor rotor coupled to the shaft, the motor rotor forming an armature of a motor for driving the rotating assembly about a rotational axis.

5. The apparatus of claim 1, where both the first air source and the second air source are structured to receive air at an ambient pressure.

6. The apparatus of claim 1, further comprising a third air inlet, the third air inlet comprising a plurality of apertures located on the compressor housing.

7. The apparatus of claim 6, where air enters the plurality of apertures located on the compressor housing and flows substantially parallel to a rotational axis of the shaft toward the volute, and then turns back and again flows substantially parallel to the rotational axis of the shaft, but away from the volute.

8. The apparatus of claim 7, where the air flowing away from the volute exits the apparatus though an aperture located in the second end of the apparatus.

9. An apparatus, comprising:
a housing;
a volute coupled to the housing;
a rotatable assembly mounted within the housing, the rotatable assembly comprising a shaft with an impeller coupled to the shaft;
a first air inlet located at a first end of the apparatus, the first air inlet providing a first air source;
a second air inlet located at a second end of the apparatus, the second air inlet providing a second air source;
a third air inlet comprising a plurality of apertures located on the housing and providing a third air source; and
a plurality of air outlets located on a rear housing cover, and positioned radially outward from the second air inlet.

10. The apparatus of claim 9, where air enters the plurality of apertures located on the housing and flows substantially parallel to a rotational axis of the shaft toward the volute, and then turns back and again flows substantially parallel to the rotational axis of the shaft, but away from the volute.

11. The apparatus of claim 9, further comprising a thrust plate coupled to the rotatable assembly, the thrust plate including at least one interior channel so that air entering the second air inlet passes through the at least one interior channel.

12. The apparatus of claim 11, where the at least one interior channel comprises a groove extending in a substantially radial direction inside the thrust plate with an inlet located adjacent to a rotational axis of the shaft and an outlet located at a perimeter of the thrust plate.

* * * * *